US010621699B2

(12) United States Patent
Azeyanagi et al.

(10) Patent No.: US 10,621,699 B2
(45) Date of Patent: *Apr. 14, 2020

(54) DISPLAYING COMPUTER GRAPHICS ACCORDING TO ARRANGEMENT AND ORIENTATION ATTRIBUTES

(71) Applicant: International Business Machines Corporation, Armonk, NY (US)

(72) Inventors: Miki Azeyanagi, Kawasaki (JP); Kenya Ishimoto, Machida (JP); Keisuke Washida, Tokyo (JP); Mayumi Goto, Ayase (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,439

(22) Filed: Jul. 31, 2019

(65) Prior Publication Data
US 2019/0355096 A1    Nov. 21, 2019

Related U.S. Application Data

(63) Continuation of application No. 15/798,438, filed on Oct. 31, 2017, now Pat. No. 10,410,324.

(51) Int. Cl.
*G06T 3/60* (2006.01)
*G06F 3/0481* (2013.01)
(Continued)

(52) U.S. Cl.
CPC ............. *G06T 3/60* (2013.01); *G06F 3/0483* (2013.01); *G06F 3/04817* (2013.01);
(Continued)

(58) Field of Classification Search
CPC ....... G06T 19/20; G06T 3/60; G06F 3/04845; G06F 3/04817
See application file for complete search history.

(56) References Cited

U.S. PATENT DOCUMENTS 7,801,907 B2    9/2010  Fischer et al.
2006/0274075 A1  12/2006  Yamazaki et al.
(Continued)

FOREIGN PATENT DOCUMENTS

WO    2017051390 A1   3/2017

OTHER PUBLICATIONS

Mell et al., "The NIST Definition of Cloud Computing," Recommendations of the National Institute of Standards and Technology, US Department of Commerce, Special Publication 800-145, Sep. 2011, 7 pages.

(Continued)

*Primary Examiner* — Robert J Craddock
(74) *Attorney, Agent, or Firm* — Jared C. Chaney

(57) ABSTRACT

The present invention provides a method, system, and computer program product of displaying computer graphics according to arrangement and orientation attributes. In an embodiment, the invention includes receiving computer graphics attribute data of computer graphics, receiving arrangement attribute data, calculating an arrangement order for the computer graphics with respect to the computer graphics attribute data and the arrangement attribute data, receiving orientation attribute data indicating an orientation attribute, receiving an orientation attribute value indicating a value of the orientation attribute, calculating orientation values for the computer graphics with respect to the computer graphics attribute values and the orientation attribute value, and displaying on the computer display the computer graphics in the arrangement order and in orientations corresponding to the orientation values, resulting in displayed computer graphics. In an embodiment, the computer graphics include at least one of computer icons and digital images.

18 Claims, 15 Drawing Sheets

(51) Int. Cl.
   *G06F 3/0483* (2013.01)
   *G06T 11/60* (2006.01)
   *G06F 3/0484* (2013.01)

(52) U.S. Cl.
   CPC .......... *G06T 11/60* (2013.01); *G06F 3/04845* (2013.01); *G06F 2203/04802* (2013.01)

(56) References Cited

U.S. PATENT DOCUMENTS

| | | |
|---|---|---|
| 2009/0235175 A1 | 9/2009 | Kardamilas |
| 2011/0102458 A1 | 5/2011 | Takiguchi et al. |
| 2014/0201681 A1 | 7/2014 | Mahaffey et al. |
| 2014/0298164 A1 | 10/2014 | Terayoko et al. |
| 2016/0154572 A1 | 6/2016 | Ogawa |
| 2017/0067751 A1 | 3/2017 | Apley |
| 2018/0130181 A1 | 5/2018 | Taketani |

OTHER PUBLICATIONS

Azeyanagi et al "Displaying Computer Graphics According to Arrangement and Orientation Attributes," U.S. Appl. No. 15/798,438, filed Oct. 31, 2017.

List of IBM Patents or Patent Applications Treated as Related, dated Jul. 29, 2019, 2 pages.

DISPLAYING COMPUTER GRAPHICS ACCORDING TO ARRANGEMENT AND ORIENTATION ATTRIBUTES

BACKGROUND

The present disclosure relates to computer graphics, and more specifically, to displaying computer graphics according to arrangement and orientation attributes.

SUMMARY

The present invention provides a computer implemented method, a system, and a computer program product of displaying computer graphics according to arrangement and orientation attributes. In an exemplary embodiment, the computer implemented method, the system, and the computer program product include (1) receiving, by a computer system, computer graphics attribute data of computer graphics, where the computer graphics attribute data indicate computer graphics attributes and computer graphics attribute values of the computer graphics, where the computer graphics attribute values indicate values of the computer graphics attributes, (2) receiving, by the computer system, arrangement attribute data indicating an arrangement attribute, (3) calculating, by the computer system, an arrangement order for the computer graphics with respect to the computer graphics attribute data and the arrangement attribute data, (4) receiving, by the computer system, orientation attribute data indicating an orientation attribute, (5) receiving, by the computer system, an orientation attribute value indicating a value of the orientation attribute, (6) calculating, by the computer system, orientation values for the computer graphics with respect to the computer graphics attribute values and the orientation attribute value, and (7) displaying, by the computer system, on the computer display the computer graphics in the arrangement order and in orientations corresponding to the orientation values, resulting in displayed computer graphics. In an embodiment, the computer graphics include at least one of computer icons and digital images.

DETAILED DESCRIPTION

Figure 1A:
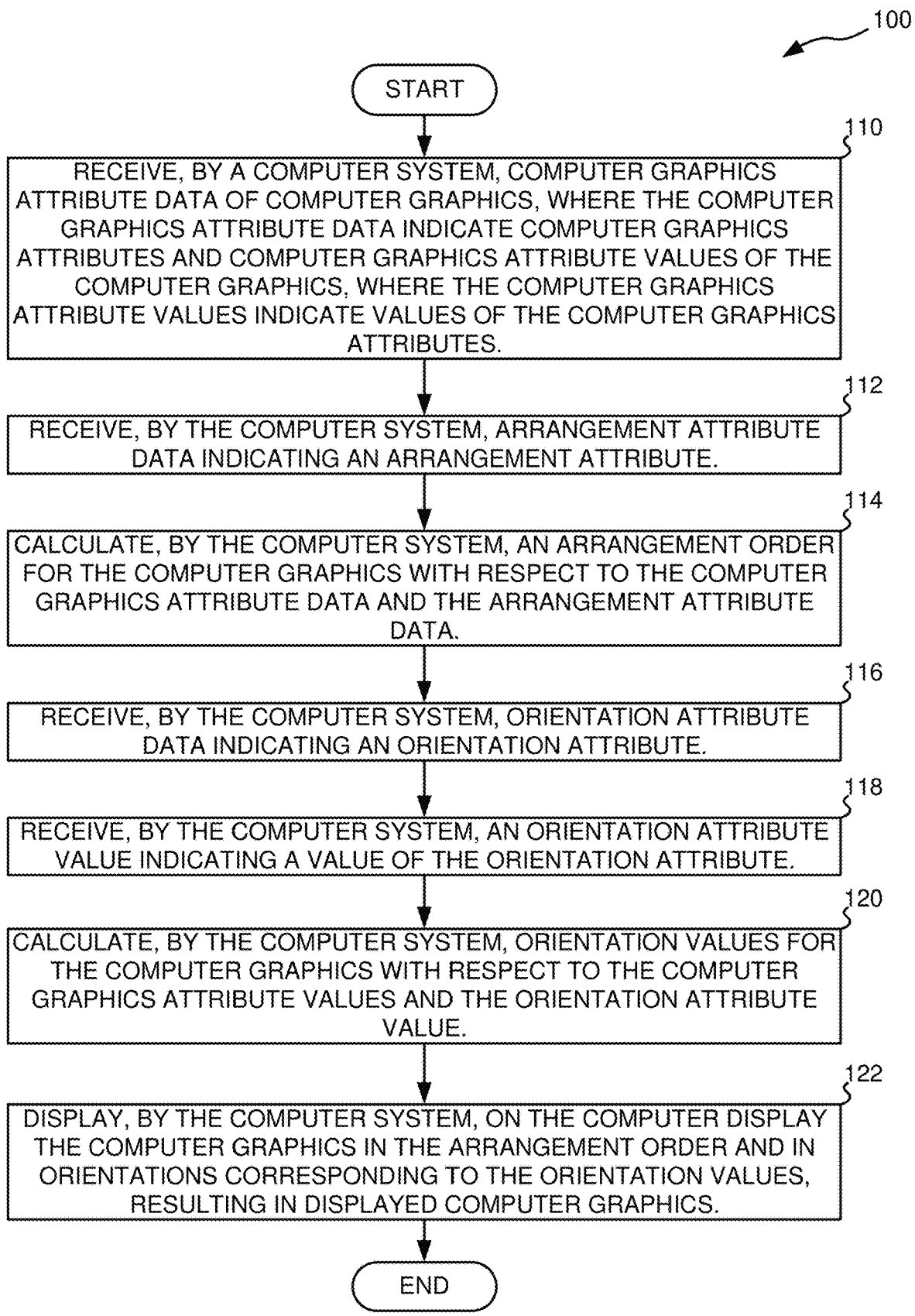
FIG. 1A depicts a flowchart in accordance with an exemplary embodiment of the present invention.

The present invention provides a computer implemented method, a system, and a computer program product of displaying computer graphics according to arrangement and orientation attributes. In an exemplary embodiment, the computer implemented method, the system, and the computer program product include (1) receiving, by a computer system, computer graphics attribute data of computer graphics, where the computer graphics attribute data indicate computer graphics attributes and computer graphics attribute values of the computer graphics, where the computer graphics attribute values indicate values of the computer graphics attributes, (2) receiving, by the computer system, arrangement attribute data indicating an arrangement attribute, (3) calculating, by the computer system, an arrangement order for the computer graphics with respect to the computer graphics attribute data and the arrangement attribute data, (4) receiving, by the computer system, orientation attribute data indicating an orientation attribute, (5) receiving, by the computer system, an orientation attribute value indicating a value of the orientation attribute, (6) calculating, by the computer system, orientation values for the computer graphics with respect to the computer graphics attribute values and the orientation attribute value, and (7) displaying, by the computer system, on the computer display the computer graphics in the arrangement order and in orientations corresponding to the orientation values, resulting in displayed computer graphics. In an embodiment, the computer graphics include at least one of computer icons and digital images. For example, the computer icons could be graphical representations of computer objects accessible via a computer system. For example, the digital images could be thumbnail images of digital photographs.

DEFINITIONS

Computer Icons

A computer icon is a pictogram or ideogram displayed on a computer screen/display in order to help a user navigate a computer system or mobile device. The computer icon is a quickly comprehensible symbol of a software tool, function, or a data file, accessible on the system, being more of a traffic sign than a detailed illustration of the actual entity it represents. A computer icon can serve as an electronic hyperlink or file shortcut to access a computer program/application or data. A user can activate a computer icon by using a computer pointer mouse, pointer, finger, or voice commands. The placement of computer icons on a computer display, also in relation to other computer icons, may provide further information to a user about the usage of such computer icons. By activating (i.e., selecting) a computer icon, the user can move directly into and out of the identified function represented by the computer icon without knowing anything further about the location or requirements of the computer file or computer software code represented by the computer icon.

Existing methods for visually representing a set of pieces of information by one single symbol (i.e., a computer icon) are widely used. Also, there are many available methods for sorting icons based on a particular property value and/or grouping icons by filtering such that items of interest are allowed to be readily recognized. Current technology allows for organizing desktop computer icons by rearranging desktop icons by a desktop context menu based on names, sizes, and update times. Also, current technology allows for sorting icons in a space for displaying a list of files, where an attribute value of a file serves as the sort key.

Digital Image

A digital image is a numeric representation, normally binary, of a two-dimensional image. A digital image can be a raster image or a bitmapped image. Raster images have a finite set of digital values, called picture elements or pixels, where the digital image contains a fixed number of rows and columns of pixels, where pixels are the smallest individual element in an image, holding antiquated values that represent the brightness of a given color at any specific point. Typically, the pixels are stored in computer memory as a raster image or raster map, a two-dimensional array of small integers, where such values are often transmitted or stored in a compressed form. Raster images can be created by a variety of input devices and techniques, such as digital cameras, scanners, coordinate-measuring machines, seismographic profiling, airborne radar, and can also be synthesized from arbitrary non-image data, such as mathematical functions or three-dimensional geometric models. In addition, current technology allows for the displaying of thumbnails of image data on a computer display.

Virtual Reality

Virtual reality (VR) is a computer technology that uses virtual reality headsets, sometimes in combination with physical spaces or multi-projected environments, to generate realistic images, sounds and other sensations that simulate the physical presence of a user in a virtual or imaginary environment (virtual reality environment). A person using virtual reality equipment is able to "look around" an artificial world, and with high quality VR move around in it and interact with virtual features or items, via VR headsets consisting of head-mounted goggles with a screen in front of the eyes, and via specially designed spaces with multiple large screens. Virtual reality also refers to remote communication environments which provide a virtual presence of users with through telepresence and telexistence or the use of a virtual artifact (VA). A virtual reality environment can be similar to the real world in order to create a lifelike experience.

Need for Displaying Computer Graphics According to Arrangement and Orientation Attributes Sorting computer graphics (e.g., computer icons, digital images) based on a one-dimensional condition, such as the property value, cannot fully meet the need of allowing items of interest to be readily recognized. For example, via such sorting techniques, computer graphics cannot be displayed in a readily recognizable manner even when data is sorted by a certain condition and further sorted by another condition. In addition, in a state where pieces of data that satisfy a criterion should be emphatically displayed while the entirety of data is recognized, the entirety of data will not able to be identified when pieces of data that do not satisfy the criterion are hidden.

Also, sorting computer graphics by a predetermined field results in a re-arrangement of data in an ascending or descending order without clarification of the states of weighting of the individual pieces of data. Sorting computer graphics by multiple conditions using a primary key and a secondary key cannot realize readily viewable arrangement of data because pieces of data sorted by the secondary key are dispersed across the entire range. When computer graphics are sorted based on their frequency of use and computer graphics having frequency of use other than the particular frequency of use are filtered and hidden, then it is not possible to identify a computer graphic or computer graphics which are not so frequently used but need to be used periodically.

Referring to FIG. 1A, in an exemplary embodiment, the present invention is configured to perform an operation 110 of receiving, by a computer system, computer graphics attribute data of computer graphics, where the computer graphics attribute data indicate computer graphics attributes and computer graphics attribute values of the computer graphics, where the computer graphics attribute values indicate values of the computer graphics attributes, an operation 112 of receiving, by the computer system, arrangement attribute data indicating an arrangement attribute, an operation 114 of calculating, by the computer system, an arrangement order for the computer graphics with respect to the computer graphics attribute data and the arrangement attribute data, an operation 116 of receiving, by the computer system, orientation attribute data indicating an orientation attribute, an operation 118 of receiving, by the computer system, an orientation attribute value indicating a value of the orientation attribute, an operation 120 of calculating, by the computer system, orientation values for the computer graphics with respect to the computer graphics attribute values and the orientation attribute value, and an operation 122 of displaying, by the computer system, on the computer display the computer graphics in the arrangement order and in orientations corresponding to the orientation values, resulting in displayed computer graphics.

In an embodiment, the present invention displays computer graphics (e.g., computer icons and thumbnails of image data) in an angled state in accordance with a value of a particular attribute, thereby allowing necessary data to be readily viewed and handled while the entirety of data is displayed. For example, the present invention could display computer graphics that fully satisfy a specified condition two-dimensionally, while displaying obliquely computer graphics that do not satisfy the specified condition in accordance with the degree of satisfaction, and displaying linearly computer graphics of a low degree of satisfaction. In a further example, the present invention allows for all computer graphics displayed on a computer display to be rotated together in accordance with a condition.

In another example, the present invention could display computer graphics representing search results of a search for stores and shops according to multiple conditions (e.g., evaluation, distance, price). Also, for example, the present invention could display computer desktop icons according to frequency of use, recently accessed items, date of creation, and/or date of revision. In addition, the present invention, for example could display in an ordered fashion (a) computer files in a computer folder, (b) statistical data, (c) face photos in an organization chart, (d) e-mail, calendar, and to-do list items, (e) in virtual reality, augmented reality, and mixed reality (displaying attribute information in a virtual space).

Figure 9:
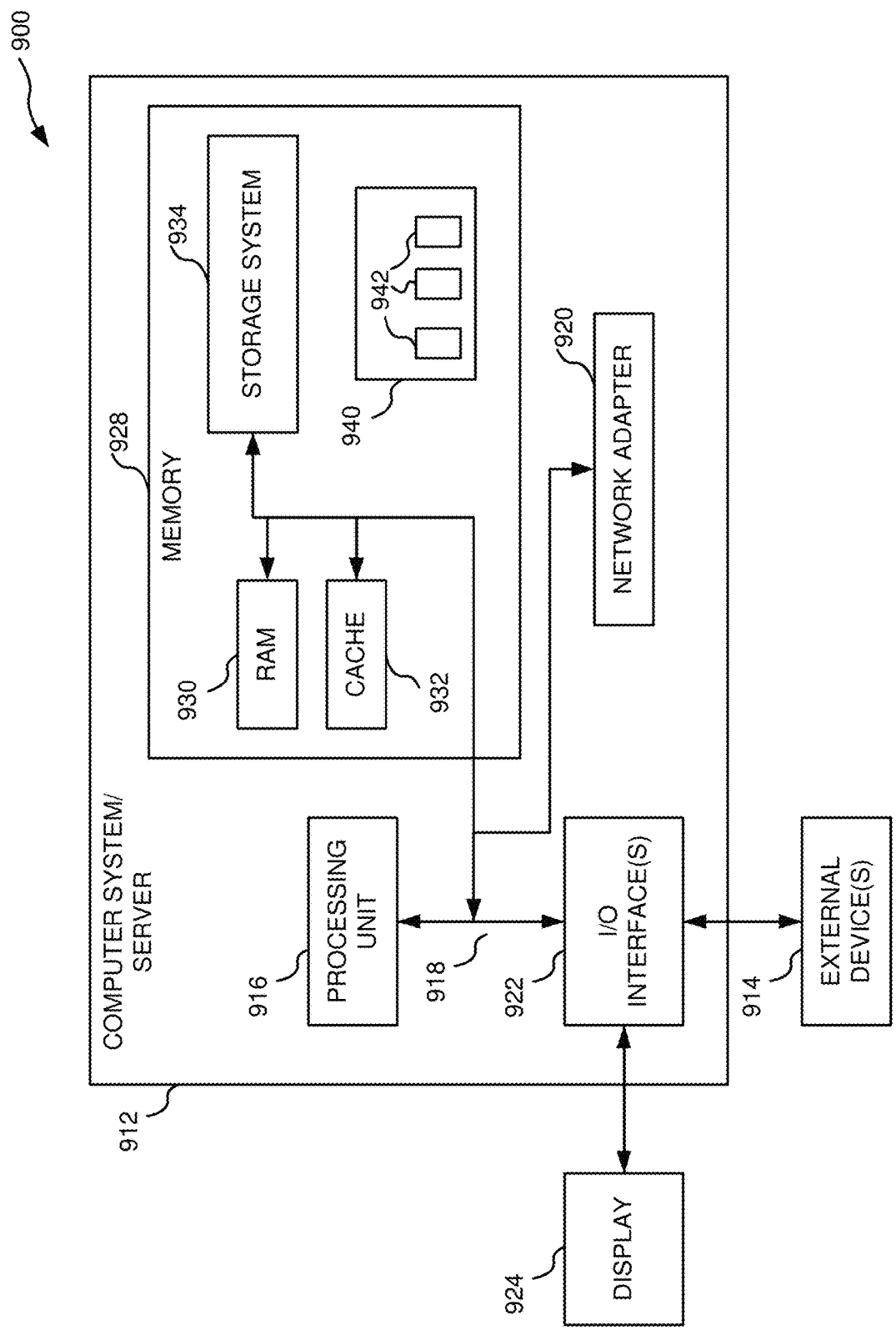
FIG. 9 depicts a computer system in accordance with an exemplary embodiment of the present invention.

In an exemplary embodiment, the computer system is a standalone computer system, such as computer system 900 shown in FIG. 9, a network of distributed computers, where at least some of the computers are computer systems such as computer system 900 shown in FIG. 9, or a cloud computing node server, such as computer system 900 shown in FIG. 9.

In an embodiment, the computer system is a computer system 900 as shown in FIG. 9, that executes a displaying computer graphics according to arrangement and orientation attributes script or computer software application that carries out the operations of at least method 100. In an embodiment, the computer system is a computer system/server 912 as shown in FIG. 9, that executes a displaying computer graphics according to arrangement and orientation attributes script or computer software application that carries out the operations of at least method 100. In an embodiment, the computer system is a processing unit 916 as shown in FIG. 9, that executes a displaying computer graphics according to arrangement and orientation attributes script or computer software application that carries out the operations of at least method 100. In an embodiment, the computer system is a computer system 900 as shown in FIG. 9, that executes a displaying computer graphics according to arrangement and orientation attributes script or computer software application that carries out at least operations 110, 112, 114, 116, 118, 120, and 122. In an embodiment, the computer system is a computer system/server 912 as shown in FIG. 9, that executes a displaying computer graphics according to arrangement and orientation attributes script or computer software application that carries out at least operations 110, 112, 114, 116, 118, 120, and 122. In an embodiment, the computer system is a processing unit 916 as shown in FIG. 9, that executes a displaying computer graphics according to arrangement and orientation attributes script or computer software application that carries out at least operations 110, 112, 114, 116, 118, 120, and 122.

Figure 1B:
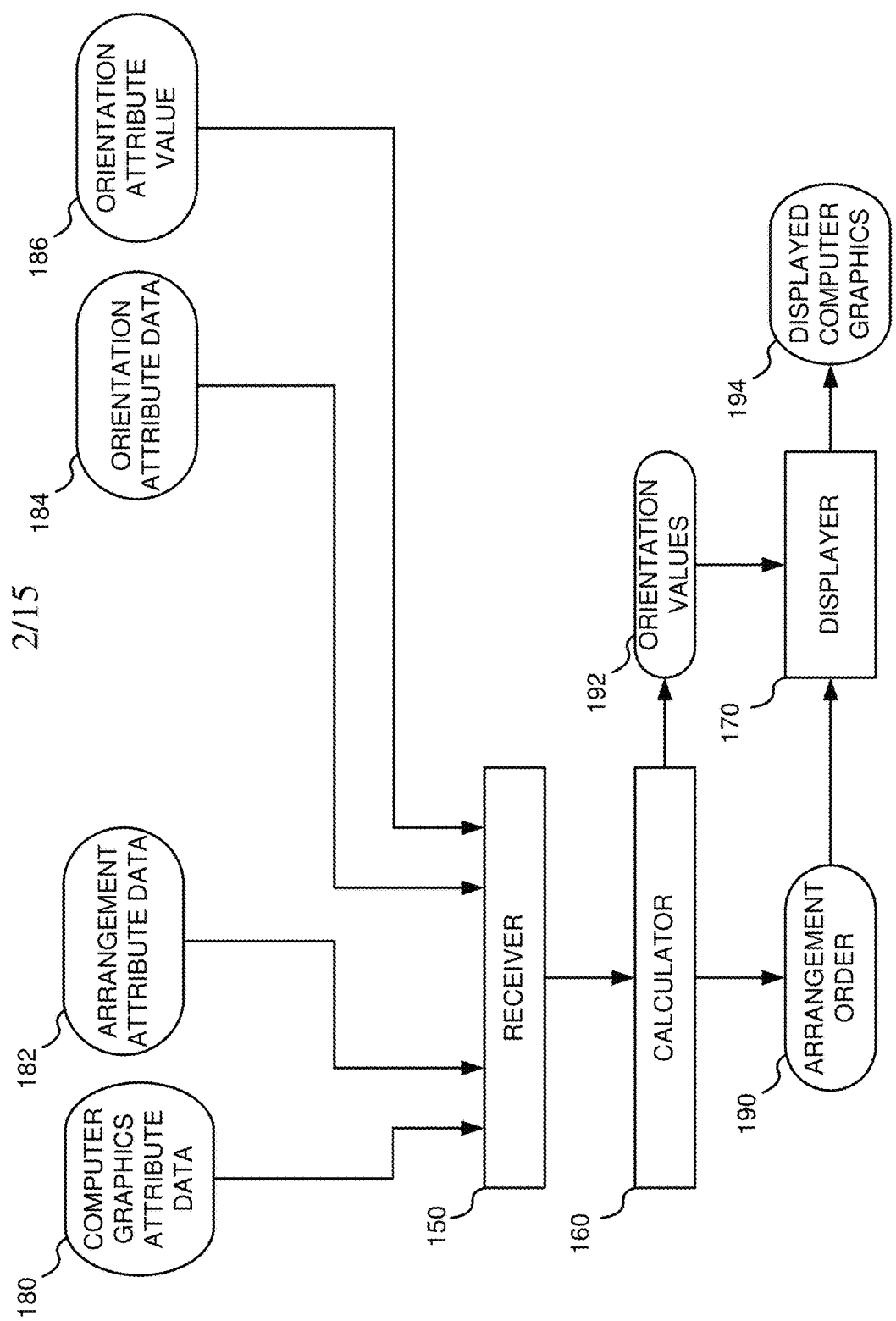
FIG. 1B depicts a block diagram in accordance with an exemplary embodiment of the present invention.

Referring to FIG. 1B, in an exemplary embodiment, the present invention includes a receiver 150, a calculator 160, and a displayer 170. In an embodiment, receiver 150 is configured to receive computer graphics attribute data 180 of computer graphics, where computer graphics attribute data 180 indicate computer graphics attributes and computer graphics attribute values of the computer graphics, where the computer graphics attribute values indicate values of the computer graphics attributes. In an embodiment, receiver 150 includes a computer system, such as computer system 900 as shown in FIG. 9, performing operation 110. In an embodiment, receiver 150 includes a computer system, such as computer system/server 912 as shown in FIG. 9, performing operation 110. In an embodiment, receiver 150 includes a computer system, such as processing unit 916 as shown in FIG. 9, performing operation 110. In an embodiment, receiver 150 is implemented as computer software executing on a computer system, such as computer system 900 as shown in FIG. 9, such that the computer system performs operation 110. In an embodiment, receiver 150 is implemented as computer software executing on a computer system, such as computer system/server 912 as shown in FIG. 9, such that the computer system performs operation 110. In an embodiment, receiver 150 is implemented as computer software executing on a computer system, such as processing unit 916 as shown in FIG. 9 such that the computer system performs operation 110. In an embodiment, receiver 150 performs operation 110 as computer software executing on a processor/processing unit of receiver 150.

In an embodiment, receiver 150 is configured to receive arrangement attribute data 182 indicating an arrangement attribute. In an embodiment, receiver 150 includes a computer system, such as computer system 900 as shown in FIG. 9, performing operation 112. In an embodiment, receiver 150 includes a computer system, such as computer system/server 912 as shown in FIG. 9, performing operation 112. In an embodiment, receiver 150 includes a computer system, such as processing unit 916 as shown in FIG. 9, performing operation 112. In an embodiment, receiver 150 is implemented as computer software executing on a computer system, such as computer system 900 as shown in FIG. 9, such that the computer system performs operation 112. In an embodiment, receiver 150 is implemented as computer software executing on a computer system, such as computer system/server 912 as shown in FIG. 9, such that the computer system performs operation 112. In an embodiment, receiver 150 is implemented as computer software executing on a computer system, such as processing unit 916 as shown in FIG. 9 such that the computer system performs operation 112. In an embodiment, receiver 150 performs operation 112 as computer software executing on a processor/processing unit of receiver 150.

In an embodiment, calculator 160 is configured to calculate an arrangement order 190 for the computer graphics with respect to computer graphics attribute data 180 and arrangement attribute data 182. In an embodiment, calculator 160 includes a computer system, such as computer system 900 as shown in FIG. 9, performing operation 114. In an embodiment, calculator 160 includes a computer system, such as computer system/server 912 as shown in FIG. 9, performing operation 114. In an embodiment, calculator 160 includes a computer system, such as processing unit 916 as shown in FIG. 9, performing operation 114. In an embodiment, calculator 160 is implemented as computer software executing on a computer system, such as computer system 900 as shown in FIG. 9, such that the computer system performs operation 114. In an embodiment, calculator 160 is implemented as computer software executing on a computer system, such as computer system/server 912 as shown in FIG. 9, such that the computer system performs operation 114. In an embodiment, calculator 160 is implemented as computer software executing on a computer system, such as processing unit 916 as shown in FIG. 9 such that the computer system performs operation 114. In an embodiment, calculator 160 performs operation 114 as computer software executing on a processor/processing unit of calculator 160.

In an embodiment, receiver 150 is configured to receive orientation attribute data 184 indicating an orientation attribute. In an embodiment, receiver 150 includes a computer system, such as computer system 900 as shown in FIG. 9, performing operation 116. In an embodiment, receiver 150 includes a computer system, such as computer system/server 912 as shown in FIG. 9, performing operation 116. In an embodiment, receiver 150 includes a computer system, such as processing unit 916 as shown in FIG. 9, performing operation 116. In an embodiment, receiver 150 is implemented as computer software executing on a computer system, such as computer system 900 as shown in FIG. 9, such that the computer system performs operation 116. In an embodiment, receiver 150 is implemented as computer software executing on a computer system, such as computer system/server 912 as shown in FIG. 9, such that the computer system performs operation 116. In an embodiment, receiver 150 is implemented as computer software executing on a computer system, such as processing unit 916 as shown in FIG. 9 such that the computer system performs operation 116. In an embodiment, receiver 150 performs operation 116 as computer software executing on a processor/processing unit of receiver 150.

In an embodiment, receiver 150 is configured to receive an orientation attribute value 186 indicating a value of the orientation attribute. In an embodiment, receiver 150 includes a computer system, such as computer system 900 as shown in FIG. 9, performing operation 118. In an embodiment, receiver 150 includes a computer system, such as computer system/server 912 as shown in FIG. 9, performing operation 118. In an embodiment, receiver 150 includes a computer system, such as processing unit 916 as shown in FIG. 9, performing operation 118. In an embodiment, receiver 150 is implemented as computer software executing on a computer system, such as computer system 900 as shown in FIG. 9, such that the computer system performs operation 118. In an embodiment, receiver 150 is implemented as computer software executing on a computer system, such as computer system/server 912 as shown in FIG. 9, such that the computer system performs operation 118. In an embodiment, receiver 150 is implemented as computer software executing on a computer system, such as processing unit 916 as shown in FIG. 9 such that the computer system performs operation 118. In an embodiment, receiver 150 performs operation 118 as computer software executing on a processor/processing unit of receiver 150.

In an embodiment, calculator 160 is configured to calculate orientation values 192 for the computer graphics with respect to the computer graphics attribute values and orientation attribute value 186. In an embodiment, calculator 160 includes a computer system, such as computer system 900 as shown in FIG. 9, performing operation 120. In an embodiment, calculator 160 includes a computer system, such as computer system/server 912 as shown in FIG. 9, performing operation 120. In an embodiment, calculator 160 includes a computer system, such as processing unit 916 as shown in FIG. 9, performing operation 120. In an embodiment, calculator 160 is implemented as computer software executing on a computer system, such as computer system 900 as shown in FIG. 9, such that the computer system performs operation 120. In an embodiment, calculator 160 is implemented as computer software executing on a computer system, such as computer system/server 912 as shown in FIG. 9, such that the computer system performs operation 120. In an embodiment, calculator 160 is implemented as computer software executing on a computer system, such as processing unit 916 as shown in FIG. 9 such that the computer system performs operation 120. In an embodiment, calculator 160 performs operation 120 as computer software executing on a processor/processing unit of calculator 160.

In an embodiment, displayer 170 is configured to display on the computer display the computer graphics in arrangement order 190 and in orientations corresponding to orientation values 192, resulting in displayed computer graphics 194. In an embodiment, displayer 170 includes a computer system, such as computer system 900 as shown in FIG. 9, performing operation 122. In an embodiment, displayer 170 includes a computer system, such as computer system/server 912 as shown in FIG. 9, performing operation 122. In an embodiment, displayer 170 includes a computer system, such as processing unit 916 as shown in FIG. 9, performing operation 122. In an embodiment, displayer 170 is implemented as computer software executing on a computer system, such as computer system 900 as shown in FIG. 9, such that the computer system performs operation 122. In an embodiment, displayer 170 is implemented as computer software executing on a computer system, such as computer system/server 912 as shown in FIG. 9, such that the computer system performs operation 122. In an embodiment, displayer 170 is implemented as computer software executing on a computer system, such as processing unit 916 as shown in FIG. 9 such that the computer system performs operation 122. In an embodiment, displayer 170 performs operation 122 as computer software executing on a processor/processing unit of displayer 170.

Calculating Orientation Values

Figure 2:
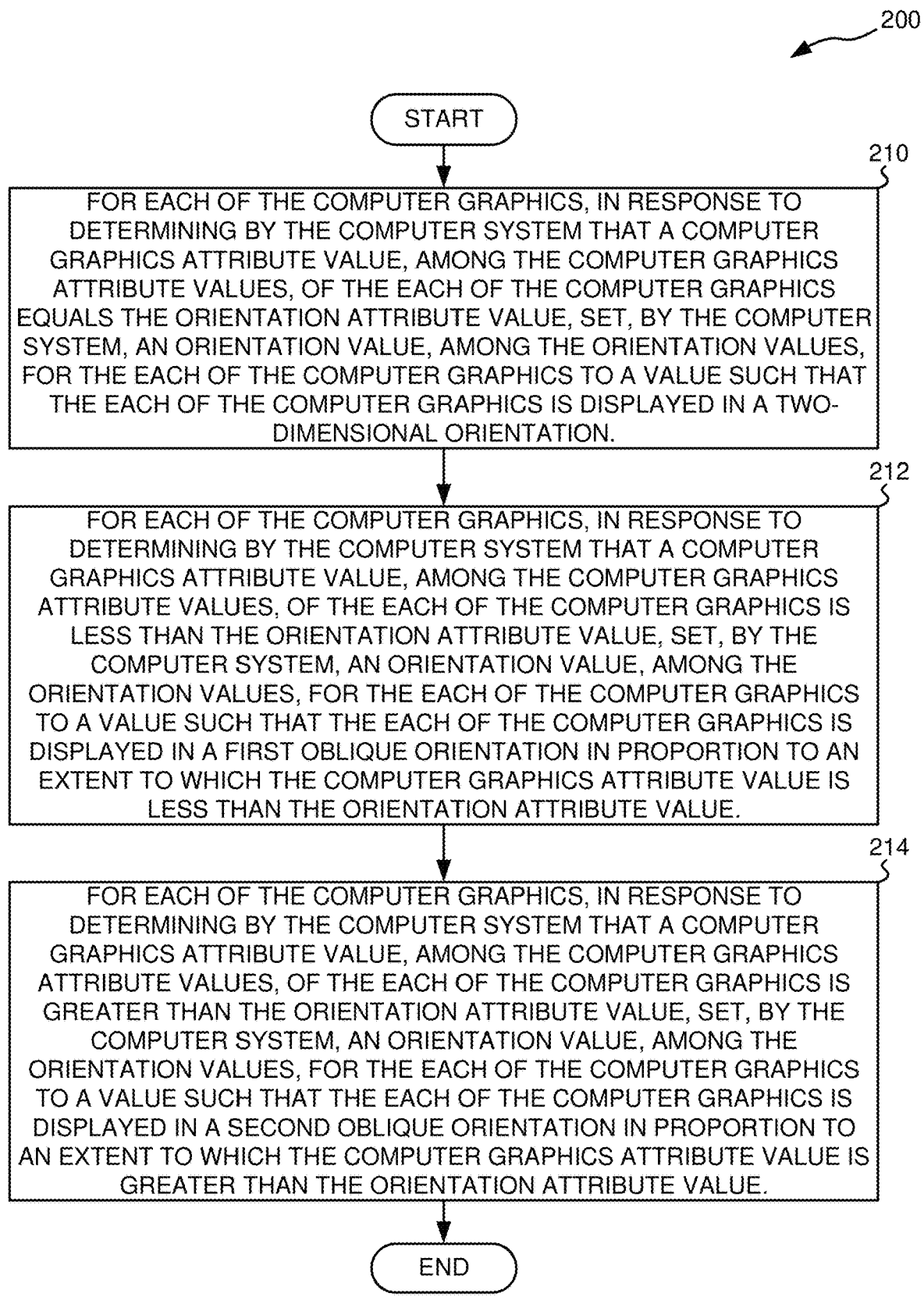
FIG. 2 depicts a flowchart in accordance with an embodiment of the present invention.

In an exemplary embodiment, the calculating the orientation values includes (a) for each of the computer graphics, in response to determining by the computer system that a computer graphics attribute value, among the computer graphics attribute values, of the each of the computer graphics equals the orientation attribute value, setting, by the computer system, an orientation value, among the orientation values, for the each of the computer graphics to a value such that the each of the computer graphics is displayed in a two-dimensional orientation, (b) for each of the computer graphics, in response to determining by the computer system that a computer graphics attribute value, among the computer graphics attribute values, of the each of the computer graphics is less than the orientation attribute value, setting, by the computer system, an orientation value, among the orientation values, for the each of the computer graphics to a value such that the each of the computer graphics is displayed in a first oblique orientation in proportion to an extent to which the computer graphics attribute value is less than the orientation attribute value, and (c) for each of the computer graphics, in response to determining by the computer system that a computer graphics attribute value, among the computer graphics attribute values, of the each of the computer graphics is greater than the orientation attribute value, setting, by the computer system, an orientation value, among the orientation values, for the each of the computer graphics to a value such that the each of the computer graphics is displayed in a second oblique orientation in proportion to an extent to which the computer graphics attribute value is greater than the orientation attribute value. Referring to FIG. 2, in an exemplary embodiment, calculating operation 120 includes an operation 210 of for each of the computer graphics, in response to determining by the computer system that a computer graphics attribute value, among the computer graphics attribute values, of the each of the computer graphics equals the orientation attribute value, setting, by the computer system, an orientation value, among the orientation values, for the each of the computer graphics to a value such that the each of the computer graphics is displayed in a two-dimensional orientation, an operation 212 of for each of the computer graphics, in response to determining by the computer system that a computer graphics attribute value, among the computer graphics attribute values, of the each of the computer graphics is less than the orientation attribute value, setting, by the computer system, an orientation value, among the orientation values, for the each of the computer graphics to a value such that the each of the computer graphics is displayed in a first oblique orientation in proportion to an extent to which the computer graphics attribute value is less than the orientation attribute value, and an operation 214 of for each of the computer graphics, in response to determining by the computer system that a computer graphics attribute value, among the computer graphics attribute values, of the each of the computer graphics is greater than the orientation attribute value, setting, by the computer system, an orientation value, among the orientation values, for the each of the computer graphics to a value such that the each of the computer graphics is displayed in a second oblique orientation in proportion to an extent to which the computer graphics attribute value is greater than the orientation attribute value.

In an embodiment, calculator 160 includes a computer system 900 as shown in FIG. 9, that executes a displaying computer graphics according to arrangement and orientation attributes script or computer software application that carries out the operations of at least method 200. In an embodiment, calculator 160 includes a computer system/server 912 as shown in FIG. 9, that executes a displaying computer graphics according to arrangement and orientation attributes script or computer software application that carries out the operations of at least method 200. In an embodiment, calculator 160 includes a processing unit 916 as shown in FIG. 9, that executes a displaying computer graphics according to arrangement and orientation attributes script or computer software application that carries out the operations of at least method 200. In an embodiment, calculator 160 includes a computer system 900 as shown in FIG. 9, that executes a displaying computer graphics according to arrangement and orientation attributes script or computer software application that carries out at least operations 210, 212, and 214. In an embodiment, calculator 160 includes a computer system/server 912 as shown in FIG. 9, that executes a displaying computer graphics according to arrangement and orientation attributes script or computer software application that carries out at least operations 210, 212, and 214. In an embodiment, calculator 160 includes a processing unit 916 as shown in FIG. 9, that executes a displaying computer graphics according to arrangement and orientation attributes script or computer software application that carries out at least operations 210, 212, and 214.

In an embodiment, calculator 160 is configured to set, for each of the computer graphics, an orientation value, among the orientation values, for the each of the computer graphics to a value such that the each of the computer graphics is displayed in a two-dimensional orientation, in response to determining by the computer system that a computer graphics attribute value, among the computer graphics attribute values, of the each of the computer graphics equals the orientation attribute value. In an embodiment, calculator 160 includes a computer system, such as computer system 900 as shown in FIG. 9, performing operation 210. In an embodiment, calculator 160 includes a computer system, such as computer system/server 912 as shown in FIG. 9, performing operation 210. In an embodiment, calculator 160 includes a computer system, such as processing unit 916 as shown in FIG. 9, performing operation 210. In an embodiment, calculator 160 is implemented as computer software executing on a computer system, such as computer system 900 as shown in FIG. 9, such that the computer system performs operation 210. In an embodiment, calculator 160 is implemented as computer software executing on a computer system, such as computer system/server 912 as shown in FIG. 9, such that the computer system performs operation 210. In an embodiment, calculator 160 is implemented as computer software executing on a computer system, such as processing unit 916 as shown in FIG. 9 such that the computer system performs operation 210. In an embodiment, calculator 160 sets, for each of the computer graphics, an orientation value, among the orientation values, for the each of the computer graphics to a value such that the each of the computer graphics is displayed in a two-dimensional orientation, in response to determining by the computer system that a computer graphics attribute value, among the computer graphics attribute values, of the each of the computer graphics equals the orientation attribute value as computer software executing on a processor/processing unit of calculator 160.

In an embodiment, calculator 160 is configured to set, for each of the computer graphics, an orientation value, among the orientation values, for the each of the computer graphics to a value such that the each of the computer graphics is displayed in a first oblique orientation in proportion to an extent to which the computer graphics attribute value is less than the orientation attribute value, in response to determining by the computer system that a computer graphics attribute value, among the computer graphics attribute values, of the each of the computer graphics is less than the orientation attribute value. In an embodiment, calculator 160 includes a computer system, such as computer system 900 as shown in FIG. 9, performing operation 212. In an embodiment, calculator 160 includes a computer system, such as computer system/server 912 as shown in FIG. 9, performing operation 212. In an embodiment, calculator 160 includes a computer system, such as processing unit 916 as shown in FIG. 9, performing operation 212. In an embodiment, calculator 160 is implemented as computer software executing on a computer system, such as computer system 900 as shown in FIG. 9, such that the computer system performs operation 212. In an embodiment, calculator 160 is implemented as computer software executing on a computer system, such as computer system/server 912 as shown in FIG. 9, such that the computer system performs operation 212. In an embodiment, calculator 160 is implemented as computer software executing on a computer system, such as processing unit 916 as shown in FIG. 9 such that the computer system performs operation 212. In an embodiment, calculator 160 sets, for each of the computer graphics, an orientation value, among the orientation values, for the each of the computer graphics to a value such that the each of the computer graphics is displayed in a first oblique orientation in proportion to an extent to which the computer graphics attribute value is less than the orientation attribute value, in response to determining by the computer system that a computer graphics attribute value, among the computer graphics attribute values, of the each of the computer graphics is less than the orientation attribute value as computer software executing on a processor/processing unit of calculator 160.

In an embodiment, calculator 160 is configured to set, for each of the computer graphics, an orientation value, among the orientation values, for the each of the computer graphics to a value such that the each of the computer graphics is displayed in a second oblique orientation in proportion to an extent to which the computer graphics attribute value is greater than the orientation attribute value, in response to determining by the computer system that a computer graphics attribute value, among the computer graphics attribute values, of the each of the computer graphics is greater than the orientation attribute value. In an embodiment, calculator 160 includes a computer system, such as computer system 900 as shown in FIG. 9, performing operation 214. In an embodiment, calculator 160 includes a computer system, such as computer system/server 912 as shown in FIG. 9, performing operation 214. In an embodiment, calculator 160 includes a computer system, such as processing unit 916 as shown in FIG. 9, performing operation 214. In an embodiment, calculator 160 is implemented as computer software executing on a computer system, such as computer system 900 as shown in FIG. 9, such that the computer system performs operation 214. In an embodiment, calculator 160 is implemented as computer software executing on a computer system, such as computer system/server 912 as shown in FIG. 9, such that the computer system performs operation 214. In an embodiment, calculator 160 is implemented as computer software executing on a computer system, such as processing unit 916 as shown in FIG. 9 such that the computer system performs operation 214. In an embodiment, calculator 160 sets, for each of the computer graphics, an orientation value, among the orientation values, for the each of the computer graphics to a value such that the each of the computer graphics is displayed in a second oblique orientation in proportion to an extent to which the computer graphics attribute value is greater than the orientation attribute value, in response to determining by the computer system that a computer graphics attribute value, among the computer graphics attribute values, of the each of the computer graphics is greater than the orientation attribute value as computer software executing on a processor/processing unit of calculator 160.

Rendering Computer Graphics in Orientations

Two-Dimensional Orientation

In an exemplary embodiment, the displaying includes in response to determining that the computer graphics attribute value of the each of the computer graphics equals the orientation attribute value, displaying the each of the computer graphics in the two-dimensional orientation, where the two-dimensional orientation is equivalent to an original orientation of the each of the computer graphics. In an exemplary embodiment, displaying operation 122 includes in response to determining by the computer system that the computer graphics attribute value of the each of the computer graphics equals the orientation attribute value, displaying the each of the computer graphics in the two-dimensional orientation, where the two-dimensional orientation is equivalent to an original orientation of the each of the computer graphics.

In an embodiment, displayer 170 is configured to display the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 includes a computer system, such as computer system 900 as shown in FIG. 9, displaying the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 includes a computer system, such as computer system/server 912 as shown in FIG. 9, displaying the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 includes a computer system, such as processing unit 916 as shown in FIG. 9, displaying the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186.

In an embodiment, displayer 170 is implemented as computer software executing on a computer system, such as computer system 900 as shown in FIG. 9, such that the computer system displays the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 is implemented as computer software executing on a computer system, such as computer system/server 912 as shown in FIG. 9, such that the computer system displays the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 is implemented as computer software executing on a computer system, such as processing unit 916 as shown in FIG. 9 such that the computer system displays the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186. In an embodiment, displayer 170 displays the each of the computer graphics in the two-dimensional orientation, where the two-dimensional orientation is equivalent to an original orientation of the each of the computer graphics, in response to determining by the computer system that the computer graphics attribute value of the each of the computer graphics equals orientation attribute value 186 as computer software executing on a processor/processing unit of displayer 170.

Oblique Orientations

First Oblique Orientation

In an exemplary embodiment, the displaying includes in response to determining that the computer graphics attribute value of the each of the computer graphics is less than the orientation attribute value, displaying the each of the computer graphics in the first oblique orientation such that the each of the computer graphics is rendered by the computer system on the computer display to appear to be rotated towards a first part of the computer display. In an exemplary embodiment, displaying operation 122 includes an operation of in response to determining that the computer graphics attribute value of the each of the computer graphics is less than the orientation attribute value, displaying the each of the computer graphics in the first oblique orientation such that the each of the computer graphics is rendered by the computer system on the computer display to appear to be rotated towards a first part of the computer display.

In an embodiment, displayer 170 is configured to display the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 includes a computer system, such as computer system 900 as shown in FIG. 9, displaying the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 includes a computer system, such as computer system/server 912 as shown in FIG. 9, displaying the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 includes a computer system, such as processing unit 916 as shown in FIG. 9, displaying the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186.

In an embodiment, displayer 170 is implemented as computer software executing on a computer system, such as computer system 900 as shown in FIG. 9, such that the computer system displays the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 is implemented as computer software executing on a computer system, such as computer system/server 912 as shown in FIG. 9, such that the computer system displays the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 is implemented as computer software executing on a computer system, such as processing unit 916 as shown in FIG. 9 such that the computer system displays the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186. In an embodiment, displayer 170 displays the each of the computer graphics in the first oblique orientation such that the each of the computer graphics is rendered by the computer system on the computer display to appear to be rotated towards a first part of the computer display, in response to determining that the computer graphics attribute value of the each of the computer graphics is less than orientation attribute value 186 as computer software executing on a processor/processing unit of displayer 170.

Second Oblique Orientation

In an exemplary embodiment, the displaying includes in response to determining that the computer graphics attribute value of the each of the computer graphics is greater than the orientation attribute value, displaying the each of the computer graphics in the second oblique orientation such that the each of the computer graphics is rendered by the computer system on the computer display to appear to be rotated towards a second part of the computer display. In an exemplary embodiment, displaying operation 122 includes an operation of in response to determining that the computer graphics attribute value of the each of the computer graphics is greater than the orientation attribute value, displaying the each of the computer graphics in the second oblique orientation such that the each of the computer graphics is rendered by the computer system on the computer display to appear to be rotated towards a second part of the computer display.

In an embodiment, displayer 170 is configured to display the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 includes a computer system, such as computer system 900 as shown in FIG. 9, displaying the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 includes a computer system, such as computer system/server 912 as shown in FIG. 9, displaying the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 includes a computer system, such as processing unit 916 as shown in FIG. 9, displaying the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186.

In an embodiment, displayer 170 is implemented as computer software executing on a computer system, such as computer system 900 as shown in FIG. 9, such that the computer system displays the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 is implemented as computer software executing on a computer system, such as computer system/server 912 as shown in FIG. 9, such that the computer system displays the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 is implemented as computer software executing on a computer system, such as processing unit 916 as shown in FIG. 9 such that the computer system displays the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186. In an embodiment, displayer 170 displays the each of the computer graphics in the second oblique orientation such that the each of the computer graphics is rendered by the computer system on the computer display to appear to be rotated towards a second part of the computer display, in response to determining that the computer graphics attribute value of the each of the computer graphics is greater than orientation attribute value 186 as computer software executing on a processor/processing unit of displayer 170.

Parts of Computer Display

In an embodiment, the first part of the computer display is a left side of the computer display, and the second part of the computer display is a right side of the computer display. In an alternative embodiment, the first part of the computer display is a right side of the computer display, and the second part of the computer display is a left side of the computer display. In an alternative embodiment, the first part of the computer display is a top side of the computer display, and the second part of the computer display is a bottom side of the computer display. In an alternative embodiment, the first part of the computer display is a bottom side of the computer display, and the second part of the computer display is a top side of the computer display. In an alternative embodiment, the first part of the computer display is a first corner of the computer display, and the second part of the computer display is a second corner of the computer display. In a specific embodiment, the first corner of the computer display is an upper left corner of the computer display, and the second corner of the computer display is a lower right corner of the computer display. In a specific embodiment, the first corner of the computer display is an upper right corner of the computer display, and the second corner of the computer display is a lower left corner of the computer display.

Visual Rendering

Figure 3:
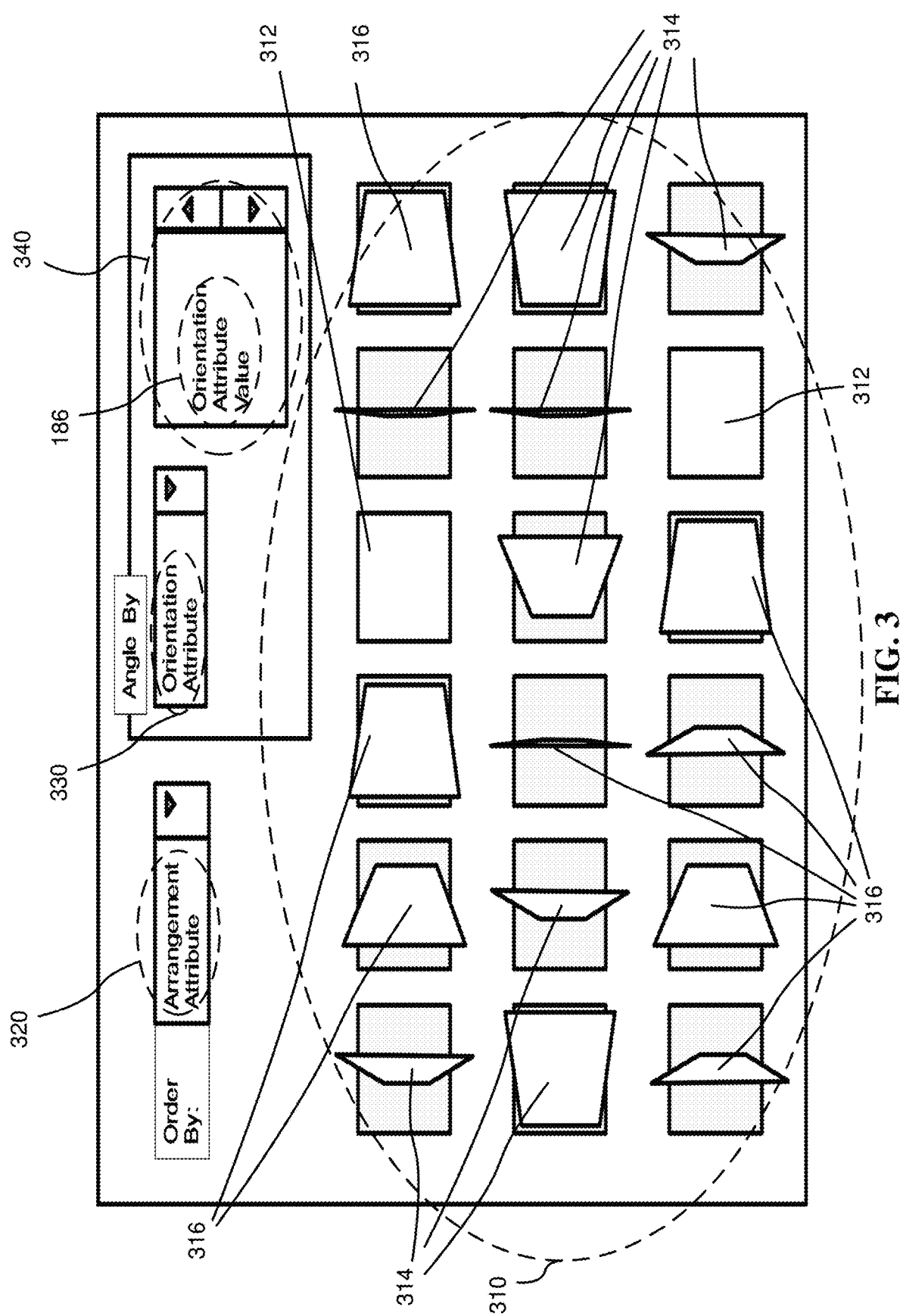
FIG. 3 depicts a graphical display in accordance with an embodiment of the present invention.

In an exemplary embodiment, the displaying includes displaying the computer graphics in the arrangement order, calculated with respect to the computer graphics attribute data and the arrangement attribute data (indicating the arrangement attribute), and in orientations corresponding to the orientation values, calculated with respect to computer graphics attribute values (indicated by the computer graphics attribute data) and the orientation attribute value (indicating a value of the orientation attribute indicated by the orientation attribute data). Referring to FIG. 3, in an exemplary embodiment, displaying operation 122 includes displaying computer graphics 310 in arrangement order 190, calculated with respect to computer graphics attribute data 180 and arrangement attribute data 182 (indicating arrangement attribute 320) and in orientations corresponding to orientation values 192, calculated with respect to computer graphics attribute values (indicated by computer graphics attribute data 180) and orientation attribute value 186 (indicating a value of orientation attribute 330 indicated by orientation attribute data 184).

In an exemplary embodiment, the displaying includes displaying the computer graphics in two-dimensional orientations, where the two-dimensional orientations are equivalent to original orientations of the computer graphics, in response to determining by the computer system that the computer graphics attribute values of the computer graphics equal the orientation attribute value. Referring to FIG. 3, in an exemplary embodiment, displaying operation 122 includes displaying computer graphics 312 in two-dimensional orientations, where the two-dimensional orientations are equivalent to original orientations of computer graphics 312, in response to determining by the computer system that the computer graphics attribute values of computer graphics 312 equal orientation attribute value 186.

In an exemplary embodiment, the displaying includes displaying the computer graphics in first oblique orientations such that the computer graphics are rendered by the computer system on the computer display to appear to be rotated towards a first part of the computer display, in response to determining that the computer graphics attribute values of the e computer graphics are less than the orientation attribute value. Referring to FIG. 3, in an exemplary embodiment, displaying operation 122 includes displaying computer graphics 314 in first oblique orientations such that computer graphics 314 are rendered by the computer system on the computer display to appear to be rotated towards a first part of the computer display, in response to determining that the computer graphics attribute values of computer graphics 314 are less than orientation attribute value 186.

In an exemplary embodiment, the displaying includes displaying the computer graphics in second oblique orientations such that the computer graphics are rendered by the computer system on the computer display to appear to be rotated towards a second part of the computer display, in response to determining that the computer graphics attribute values of the computer graphics are greater than the orientation attribute value. Referring to FIG. 3, in an exemplary embodiment, displaying operation 122 includes displaying computer graphics 316 in second oblique orientations such that computer graphics 316 are rendered by the computer system on the computer display to appear to be rotated towards a second part of the computer display, in response to determining that the computer graphics attribute values of computer graphics 316 are greater than orientation attribute value 186.

Receiving Orientation Attribute Value

In an embodiment, the receiving the orientation attribute value includes receiving the orientation attribute value via an orientation attribute value selector graphical user interface displayed by the computer system on the computer display. In an exemplary embodiment, receiving operation 118 includes an operation of receiving the orientation attribute value via an orientation attribute value selector graphical user interface displayed by the computer system on the computer display.

Referring to FIG. 3, in an embodiment, receiver 150 is configured to receive orientation attribute value 186 via an orientation attribute value selector graphical user interface 340 displayed by displayer 170 on the computer display. In an embodiment, receiver 150 includes a computer system, such as computer system 900 as shown in FIG. 9, receiving orientation attribute value 186 via orientation attribute value selector graphical user interface 340 displayed by displayer 170 on the computer display. In an embodiment, receiver 150 includes a computer system, such as computer system/server 912 as shown in FIG. 9, receiving orientation attribute value 186 via orientation attribute value selector graphical user interface 340 displayed by displayer 170 on the computer display. In an embodiment, receiver 150 includes a computer system, such as processing unit 916 as shown in FIG. 9, receiving orientation attribute value 186 via orientation attribute value selector graphical user interface 340 displayed by displayer 170 on the computer display.

In an embodiment, receiver 150 is implemented as computer software executing on a computer system, such as computer system 900 as shown in FIG. 9, such that the computer system receives orientation attribute value 186 via orientation attribute value selector graphical user interface 340 displayed by displayer 170 on the computer display. In an embodiment, receiver 150 is implemented as computer software executing on a computer system, such as computer system/server 912 as shown in FIG. 9, such that the computer system receives orientation attribute value 186 via orientation attribute value selector graphical user interface 340 displayed by displayer 170 on the computer display. In an embodiment, receiver 150 is implemented as computer software executing on a computer system, such as processing unit 916 as shown in FIG. 9 such that the computer system receives orientation attribute value 186 via orientation attribute value selector graphical user interface 340 displayed by displayer 170 on the computer display. In an embodiment, receiver 150 receives orientation attribute value 186 via orientation attribute value selector graphical user interface 340 displayed by displayer 170 on the computer display as computer software executing on a processor/processing unit of displayer 170.

Computer Graphics Attributes

In an exemplary embodiment, each of the computer graphics is associated with a computer object, and the computer graphics attributes include quantifiable attributes, where the quantifiable attributes include at least one of a type attributed to the computer object, a name attributed to the computer object, and at least one timestamp associated with the computer object. For example, the computer object could be a computer file (e.g., a word processing file, a spreadsheet file, a presentation file, a database file, a web page file, an image file (i.e., image file of a digital photograph), a video file, or an audio file. Also, the quantifiable attributes could be distance, amount of money, an evaluation score, and the size of an item in a digital photograph.

In an embodiment, the type includes a file type of the computer object. For example, the file type could be "document" (e.g., .doc, .docx), "spreadsheet" (e.g., .xls, .xlsx), "presentation" (e.g., .ppt, .pptx), "database" (e.g., .accdb), "web page" (e.g., .htm, .html), or "image" (e.g., .jpg, .gif, .tif, .png), or "video" (e.g., .avi, .flv, .mp4, .mpg, .qtl, .mov). In an embodiment, the name includes a file name of the computer object. In an embodiment, the at least one timestamp is selected from the group consisting of a creation timestamp, a last accessed timestamp, a last modified timestamp, a last printed timestamp, and a last shared timestamp.

Compacted Form

Figure 4A:
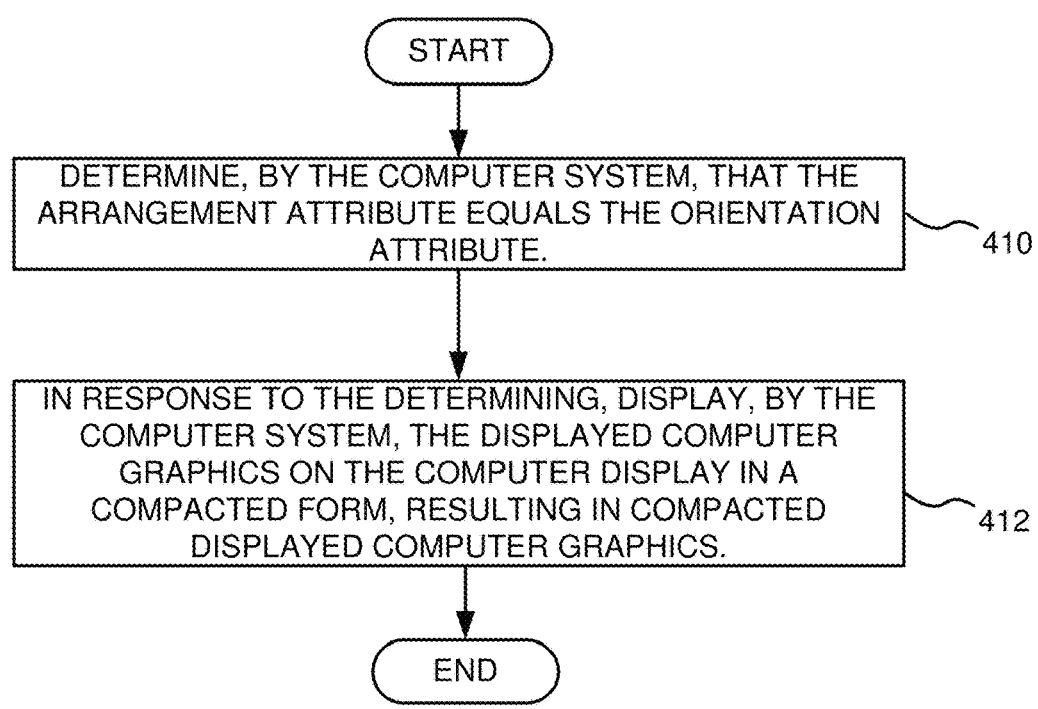
FIG. 4A depicts a flowchart in accordance with an embodiment of the present invention.

In a further embodiment, the computer implemented method, the system, and the computer program product further include (a) determining, by the computer system, that the arrangement attribute equals the orientation attribute, and (b) in response to the determining, displaying, by the computer system, the displayed computer graphics on the computer display in a compacted form, resulting in compacted displayed computer graphics. Referring to FIG. 4A, in a further embodiment, the present invention is further configured to perform an operation 410 of determining, by the computer system, that the arrangement attribute equals the orientation attribute, and an operation 412 of in response to the determining, displaying, by the computer system, the displayed computer graphics on the computer display in a compacted form, resulting in compacted displayed computer graphics.

In an embodiment, the computer system is a computer system 900 as shown in FIG. 9, that executes a displaying computer graphics according to arrangement and orientation attributes script or computer software application that carries out the operations of at least method 400. In an embodiment, the computer system is a computer system/server 912 as shown in FIG. 9, that executes a displaying computer graphics according to arrangement and orientation attributes script or computer software application that carries out the operations of at least method 400. In an embodiment, the computer system is a processing unit 916 as shown in FIG. 9, that executes a displaying computer graphics according to arrangement and orientation attributes script or computer software application that carries out the operations of at least method 400. In an embodiment, the computer system is a computer system 900 as shown in FIG. 9, that executes a displaying computer graphics according to arrangement and orientation attributes script or computer software application that carries out at least operations 410 and 412. In an embodiment, the computer system is a computer system/server 912 as shown in FIG. 9, that executes a displaying computer graphics according to arrangement and orientation attributes script or computer software application that carries out at least operations 410 and 412. In an embodiment, the computer system is a processing unit 916 as shown in FIG. 9, that executes a displaying computer graphics according to arrangement and orientation attributes script or computer software application that carries out at least op operations 410 and 412.

Figure 4B:
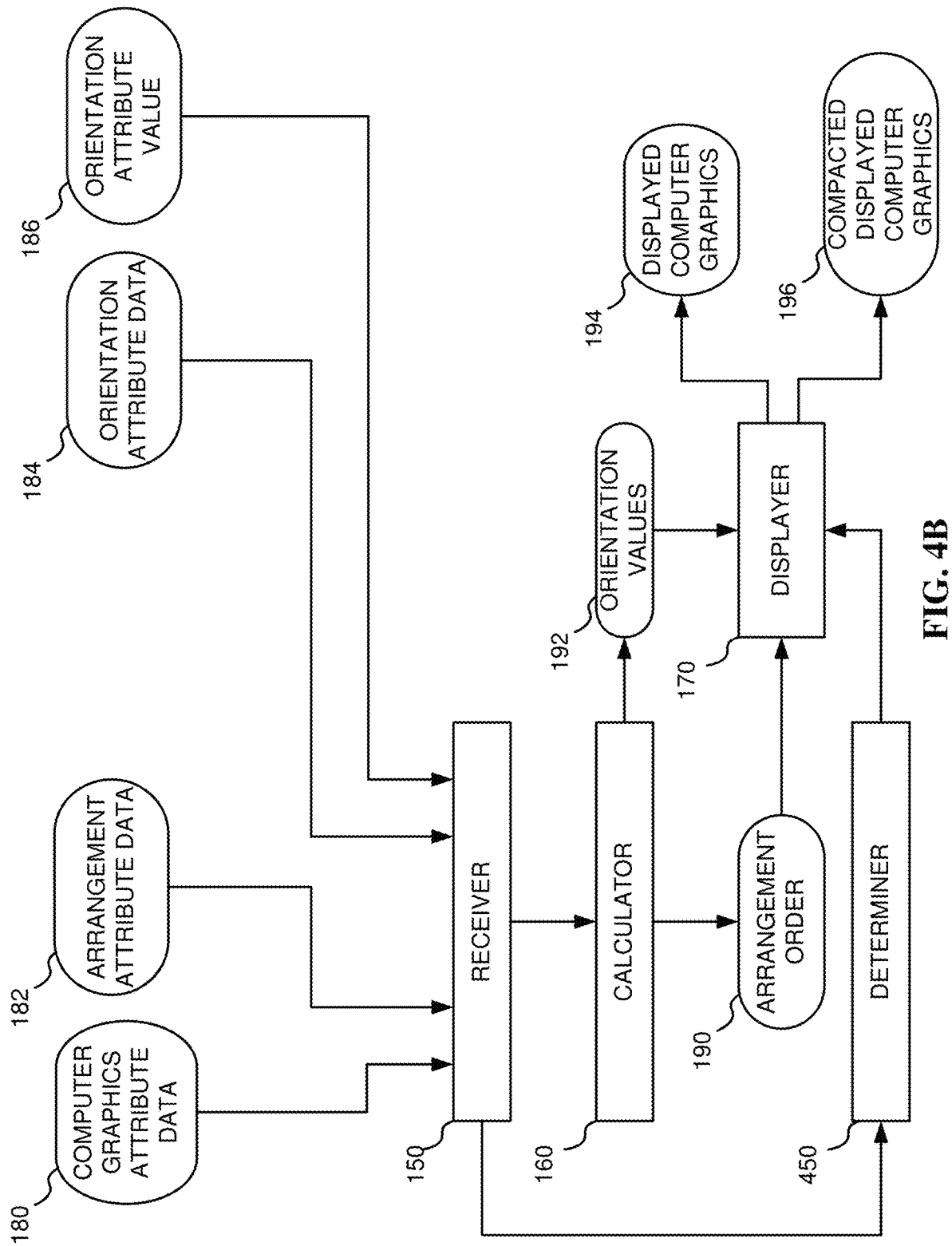
FIG. 4B depicts a block diagram in accordance with an exemplary embodiment of the present invention.

Referring to FIG. 4B, in a further embodiment, the present invention further includes a determiner 450. In an embodiment, determiner 450 is configured to determine that the arrangement attribute equals the orientation attribute. In an embodiment, determiner 450 includes a computer system, such as computer system 900 as shown in FIG. 9, performing operation 410. In an embodiment, determiner 450 includes a computer system, such as computer system/server 912 as shown in FIG. 9, performing operation 410. In an embodiment, determiner 450 includes a computer system, such as processing unit 916 as shown in FIG. 9, performing operation 410. In an embodiment, determiner 450 is implemented as computer software executing on a computer system, such as computer system 900 as shown in FIG. 9, such that the computer system performs operation 410. In an embodiment, determiner 450 is implemented as computer software executing on a computer system, such as computer system/server 912 as shown in FIG. 9, such that the computer system performs operation 410. In an embodiment, determiner 450 is implemented as computer software executing on a computer system, such as processing unit 916 as shown in FIG. 9 such that the computer system performs operation 410. In an embodiment, determiner 450 performs operation 410 as computer software executing on a processor/processing unit of determiner 450.

In an embodiment, displayer 170 is configured to display, in response to the determining, displayed computer graphics 194 on the computer display in a compacted form, resulting in compacted displayed computer graphics 196. In an embodiment, displayer 170 includes a computer system, such as computer system 900 as shown in FIG. 9, performing operation 412. In an embodiment, displayer 170 includes a computer system, such as computer system/server 912 as shown in FIG. 9, performing operation 122. In an embodiment, displayer 170 includes a computer system, such as processing unit 916 as shown in FIG. 9, performing operation 412. In an embodiment, displayer 170 is implemented as computer software executing on a computer system, such as computer system 900 as shown in FIG. 9, such that the computer system performs operation 412. In an embodiment, displayer 170 is implemented as computer software executing on a computer system, such as computer system/server 912 as shown in FIG. 9, such that the computer system performs operation 412. In an embodiment, displayer 170 is implemented as computer software executing on a computer system, such as processing unit 916 as shown in FIG. 9 such that the computer system performs operation 412. In an embodiment, displayer 170 performs operation 412 as computer software executing on a processor/processing unit of displayer 170.

Visual Rendering

Figure 5:
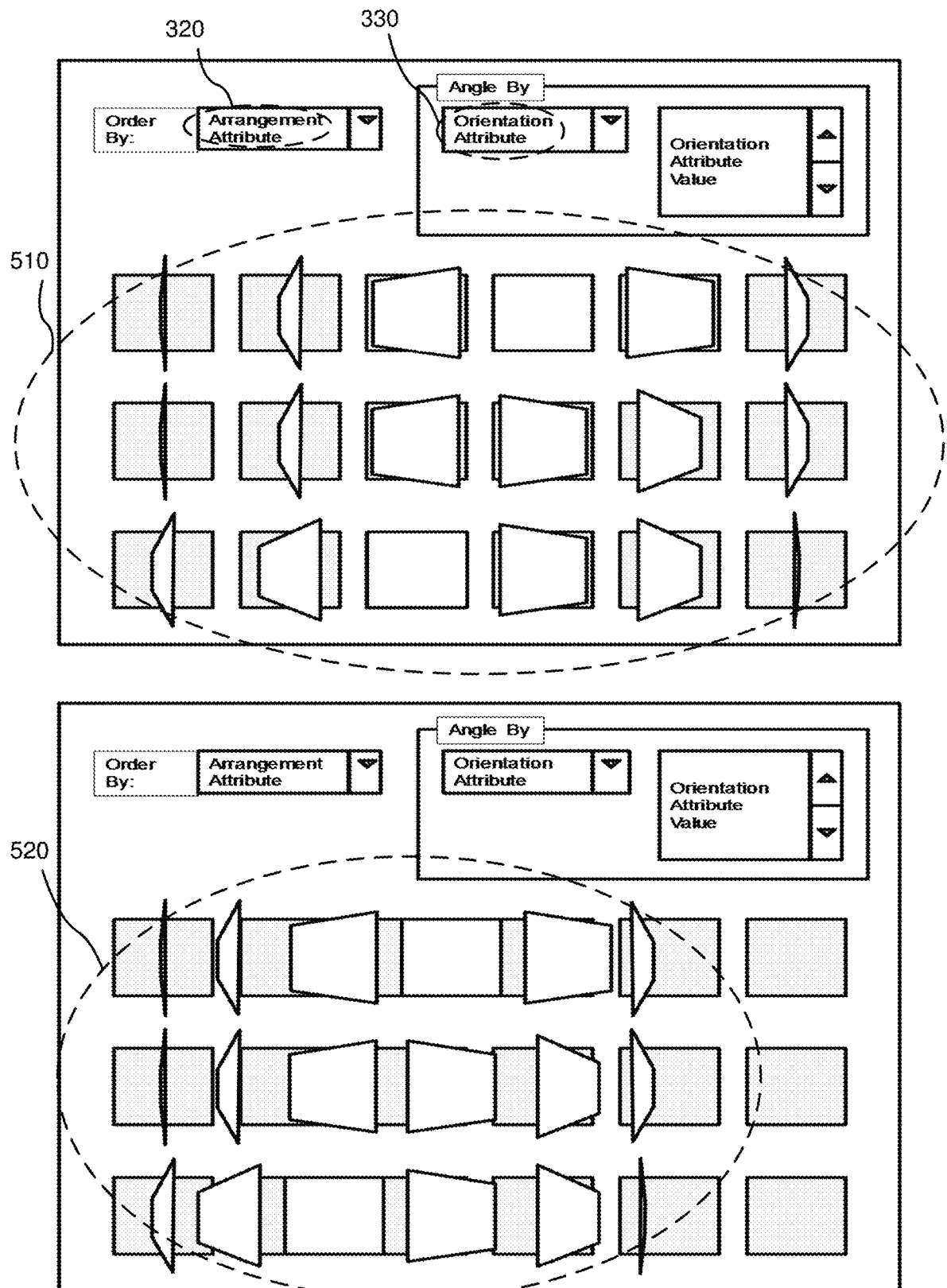
FIG. 5 depicts a graphical display in accordance with an embodiment of the present invention.

Referring to FIG. 5, in a further embodiment, the present invention further includes (a) determining, by the computer system, that arrangement attribute 320 equals orientation attribute 330, and (b) in response to the determining, displaying, by the computer system, displayed computer graphics 510 on the computer display in a compacted form 520, resulting in compacted displayed computer graphics 520.

Rendering Computer Graphics in Virtual Reality Environment

Figure 6:
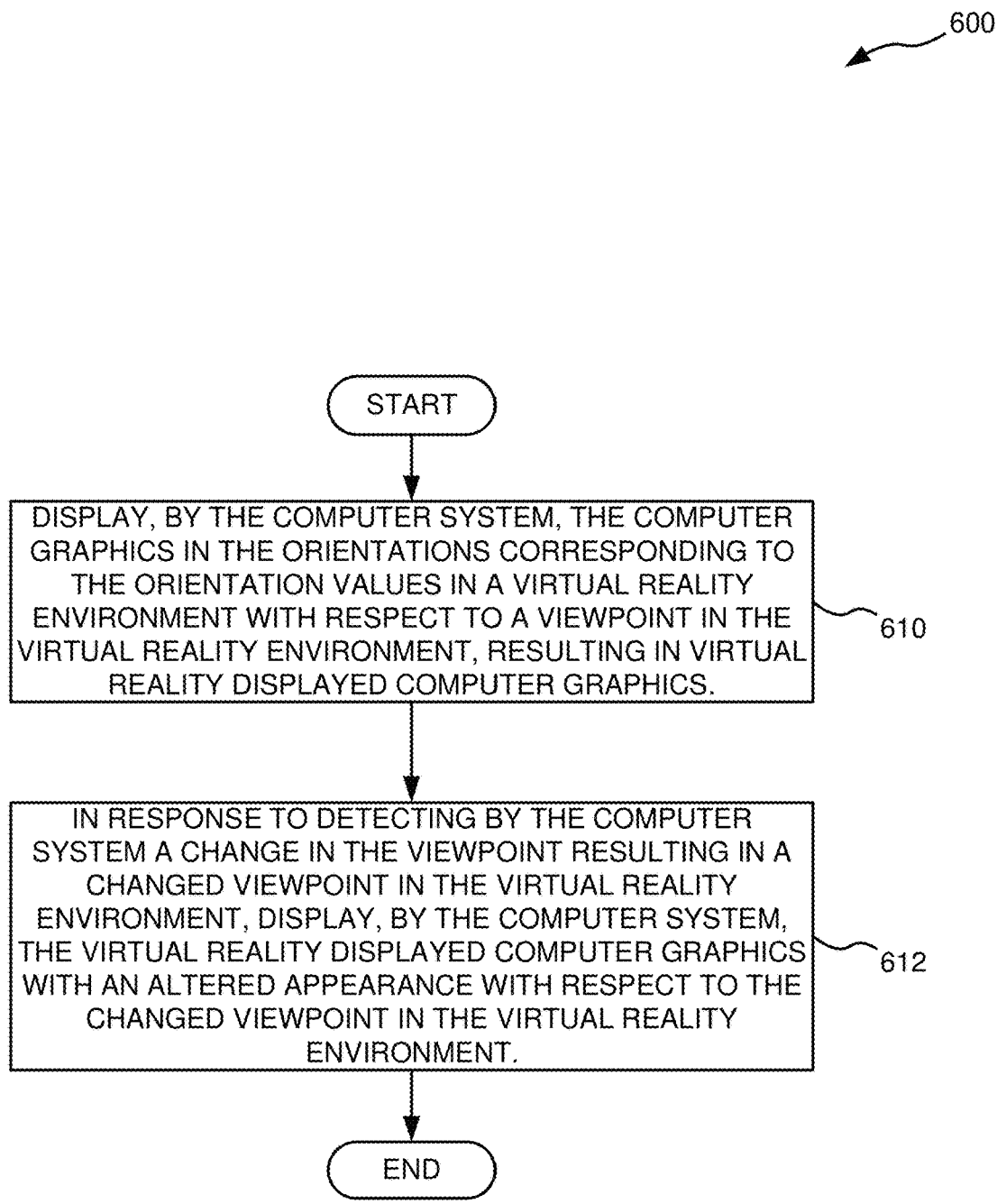
FIG. 6 depicts a flowchart in accordance with an embodiment of the present invention.

In an exemplary embodiment, the displaying includes (a) displaying, by the computer system, the computer graphics in the orientations corresponding to the orientation values in a virtual reality environment with respect to a viewpoint in the virtual reality environment, resulting in virtual reality displayed computer graphics, and (b) in response to detecting by the computer system a change in the viewpoint resulting in a changed viewpoint in the virtual reality environment, displaying, by the computer system, the virtual reality displayed computer graphics with an altered appearance with respect to the changed viewpoint in the virtual reality environment. Referring to FIG. 6, in an exemplary embodiment, displaying operation 122 includes an operation 610 of displaying, by the computer system, the computer graphics in the orientations corresponding to the orientation values in a virtual reality environment with respect to a viewpoint in the virtual reality environment, resulting in virtual reality displayed computer graphics, and an operation 612 of in response to detecting by the computer system a change in the viewpoint resulting in a changed viewpoint in the virtual reality environment, displaying, by the computer system, the virtual reality displayed computer graphics with an altered appearance with respect to the changed viewpoint in the virtual reality environment.

In an embodiment, displayer 170 includes a computer system 900 as shown in FIG. 9, that executes a displaying computer graphics according to arrangement and orientation attributes script or computer software application that carries out the operations of at least method 600. In an embodiment, displayer 170 includes a computer system/server 912 as shown in FIG. 9, that executes a displaying computer graphics according to arrangement and orientation attributes script or computer software application that carries out the operations of at least method 600. In an embodiment, displayer 170 includes a processing unit 916 as shown in FIG. 9, that executes a displaying computer graphics according to arrangement and orientation attributes script or computer software application that carries out the operations of at least method 600. In an embodiment, displayer 170 includes a computer system 900 as shown in FIG. 9, that executes a displaying computer graphics according to arrangement and orientation attributes script or computer software application that carries out at least operations 610 and 612. In an embodiment, displayer 170 includes a computer system/server 912 as shown in FIG. 9, that executes a displaying computer graphics according to arrangement and orientation attributes script or computer software application that carries out at least operations 610 and 612. In an embodiment, displayer 170 includes a processing unit 916 as shown in FIG. 9, that executes a displaying computer graphics according to arrangement and orientation attributes script or computer software application that carries out at least operations 610 and 612.

In an embodiment, displayer 170 is configured to display the computer graphics in the orientations corresponding to orientation values 192 in a virtual reality environment with respect to a viewpoint in the virtual reality environment, resulting in virtual reality displayed computer graphics. In an embodiment, displayer 170 includes a computer system, such as computer system 900 as shown in FIG. 9, performing operation 610. In an embodiment, displayer 170 includes a computer system, such as computer system/server 912 as shown in FIG. 9, performing operation 610. In an embodiment, displayer 170 includes a computer system, such as processing unit 916 as shown in FIG. 9, performing operation 610. In an embodiment, displayer 170 is implemented as computer software executing on a computer system, such as computer system 900 as shown in FIG. 9, such that the computer system performs operation 610. In an embodiment, displayer 170 is implemented as computer software executing on a computer system, such as computer system/server 912 as shown in FIG. 9, such that the computer system performs operation 610. In an embodiment, displayer 170 is implemented as computer software executing on a computer system, such as processing unit 916 as shown in FIG. 9 such that the computer system performs operation 610. In an embodiment, displayer 170 display the computer graphics in the orientations corresponding to orientation values 192 in a virtual reality environment with respect to a viewpoint in the virtual reality environment, resulting in virtual reality displayed computer graphics as computer software executing on a processor/processing unit of calculator 160.

In an embodiment, displayer 170 is configured to display the virtual reality displayed computer graphics with an altered appearance with respect to a changed viewpoint in the virtual reality environment, in response to detecting by the computer system a change in the viewpoint that resulted in the changed viewpoint in the virtual reality environment. In an embodiment, displayer 170 includes a computer system, such as computer system 900 as shown in FIG. 9, performing operation 612. In an embodiment, displayer 170 includes a computer system, such as computer system/server 912 as shown in FIG. 9, performing operation 612. In an embodiment, displayer 170 includes a computer system, such as processing unit 916 as shown in FIG. 9, performing operation 612. In an embodiment, displayer 170 is implemented as computer software executing on a computer system, such as computer system 900 as shown in FIG. 9, such that the computer system performs operation 612. In an embodiment, displayer 170 is implemented as computer software executing on a computer system, such as computer system/server 912 as shown in FIG. 9, such that the computer system performs operation 612. In an embodiment, displayer 170 is implemented as computer software executing on a computer system, such as processing unit 916 as shown in FIG. 9 such that the computer system performs operation 612. In an embodiment, displayer 170 displays the virtual reality displayed computer graphics with an altered appearance with respect to a changed viewpoint in the virtual reality environment, in response to detecting by the computer system a change in the viewpoint that resulted in the changed viewpoint in the virtual reality environment as computer software executing on a processor/processing unit of displayer 170.

Example

Figure 7A:
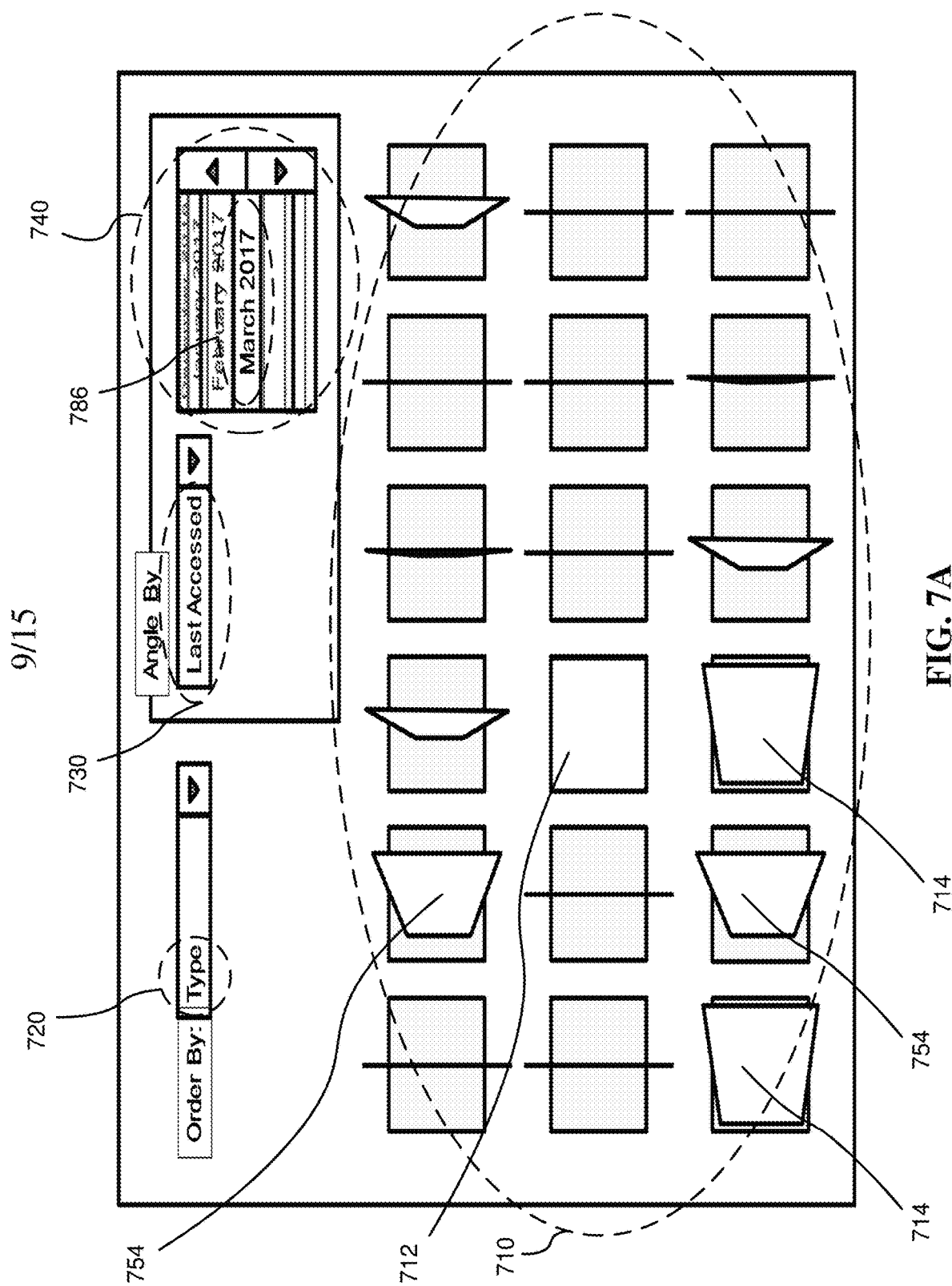
FIG. 7A depicts a graphical display in accordance with an embodiment of the present invention.

Referring to FIG. 7A, for example, the present invention could display computer graphics 710 (examples of computer graphics 310) in arrangement order 190, calculated with respect to computer graphics attribute data 180 and arrangement attribute data 182 (indicating an arrangement attribute 720 of "Type" (an example of arrangement attribute 320) and in orientations corresponding to orientation values 192, calculated with respect to computer graphics attribute values (indicated by computer graphics attribute data 180) and an orientation attribute value 786 of "March 2017" (an example of orientation attribute value 186) (indicating a value of an orientation attribute 730 of "Last Accessed) (an example of orientation attribute 330) indicated by orientation attribute data 184). In a further example, the present invention could display computer graphics 712 (an example of computer graphics 312) in a two-dimensional orientation (i.e., the original orientation of computer graphics 712) if the "Last Accessed" computer graphics attribute value of computer graphics 712 equals "March 2017". In another example, the present invention could display computer graphics 714 (an example of computer graphics 314) in a first oblique orientation toward the left side of the computer display if the "Last Accessed" computer graphics attribute values of computer graphics 714 are less than "March 2017" (e.g., if the "Last Accessed" computer graphics attribute values of computer graphics 714 equals "February 2017"). In another example, the present invention could display computer graphics 754 (an example of computer graphics 314) in a further first oblique orientation further toward the left side of the computer display if the "Last Accessed" computer graphics attribute values of computer graphics 754 are less than "March 2017" to an extent more than computer graphics 714 (e.g., if the "Last Accessed" computer graphics attribute values of computer graphics 754 equals "January 2017").

Figure 7B:
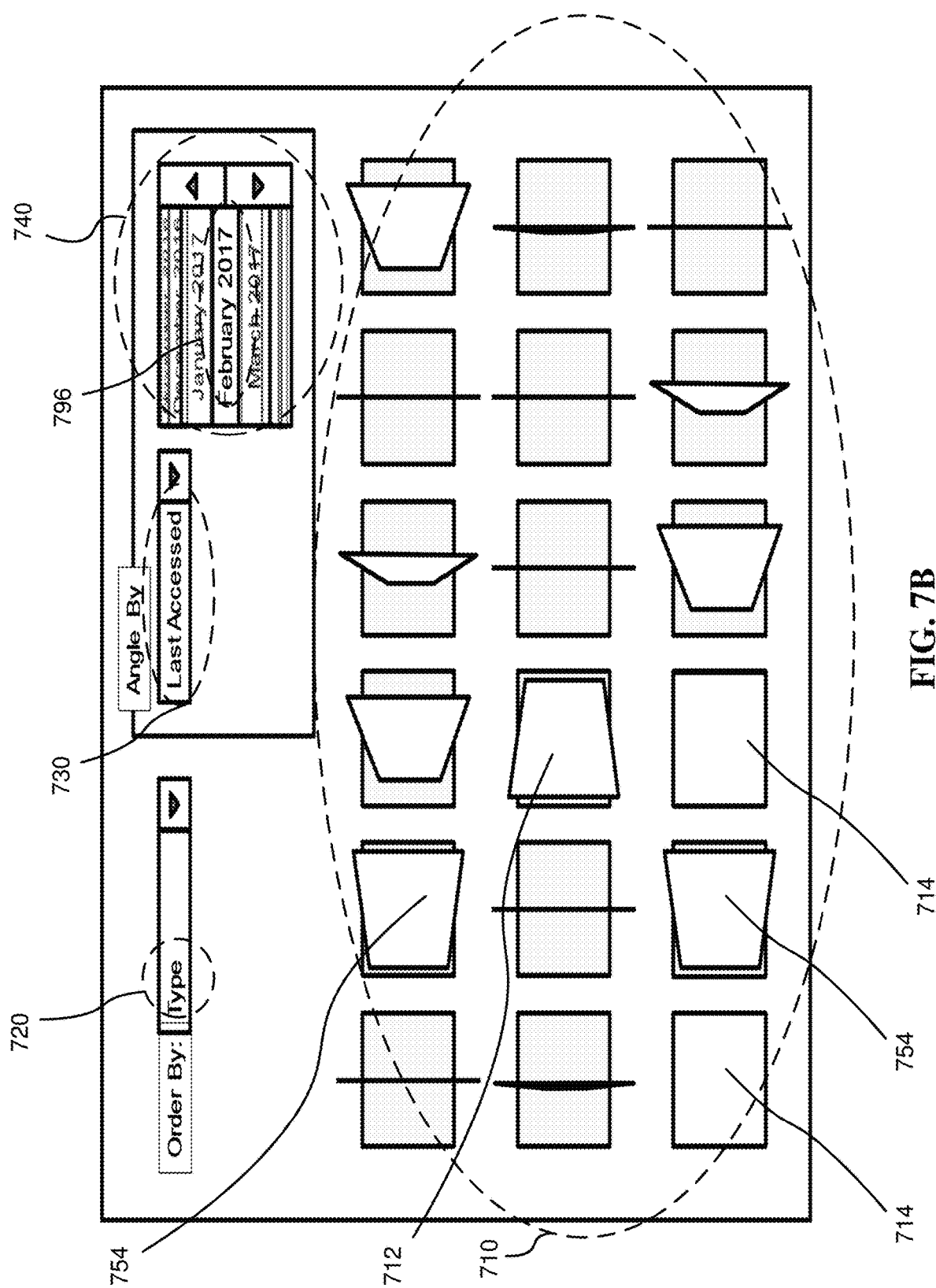
FIG. 7B depicts graphical displays in accordance with an embodiment of the present invention.

Referring to FIG. 7B, for example, the present invention could display computer graphics 710 (examples of computer graphics 310) in arrangement order 190, calculated with respect to computer graphics attribute data 180 and arrangement attribute data 182 (indicating an arrangement attribute 720 of "Type" (an example of arrangement attribute 320) and in orientations corresponding to orientation values 192, calculated with respect to computer graphics attribute values (indicated by computer graphics attribute data 180) and an orientation attribute value 796 of "February 2017" (an example of orientation attribute value 186) (indicating a value of an orientation attribute 730 of "Last Accessed) (an example of orientation attribute 330) indicated by orientation attribute data 184). In a further example, the present invention could display computer graphics 714 (an example of computer graphics 312) in two-dimensional orientations (i.e., the original orientations of computer graphics 714) if the "Last Accessed" computer graphics attribute value of computer graphics 714 equals "February 2017". In another example, the present invention could display computer graphics 754 (an example of computer graphics 314) in a first oblique orientation towards the left side of the computer display if the "Last Accessed" computer graphics attribute values of computer graphics 754 are less than "February 2017" (e.g., if the "Last Accessed" computer graphics attribute values of computer graphics 754 equals "January 2017"). In another example, the present invention could display computer graphics 712 (an example of computer graphics 316) in a second oblique orientation towards the right side of the computer display if the "Last Accessed" computer graphics attribute values of computer graphics 712 is greater than "March 2017" (e.g., if the "Last Accessed" computer graphics attribute value of computer graphics 712 equals "March 2017").

Referring to FIG. 7A and FIG. 7B, for example, the present invention could receive orientation attribute value 796 via an orientation attribute value selector graphical user interface 740 displayed by the computer system on the computer display. In specific example, orientation attribute value selector graphical user interface 740 could allow for the inputting/selecting of orientation attribute value 796 (e.g., via up and down arrow graphical user interface controls of orientation attribute value selector graphical user interface 740) in manner similar to how a computer pointer mouse wheel position and/or a card in a rotating file holder could be selected.

Referring to FIG. 7A and FIG. 7B, for example, computer graphics 710 could be computer application/data icons on a desktop of a graphical shell of a computer operation system. Specifically, for example, the present invention could allow a user to specify to arrange icons by arrangement attribute 320, 720 (e.g., object type (i.e., program, text, word processing document), name), and to specify to set angles of icons by orientation attribute 330, 730 (e.g., "last accessed" timestamp). In a further example, the present invention could allow the user to change the current month by orientation attribute value selector graphical user interface 740 (e.g., a computer pointer mouse wheel/up and down arrows), where the present invention displays icons accessed in the current month face in front in a two-dimensional orientation while displaying other icons in orientations/angles according to how past/future from the current month such icons are.

Figure 8A:
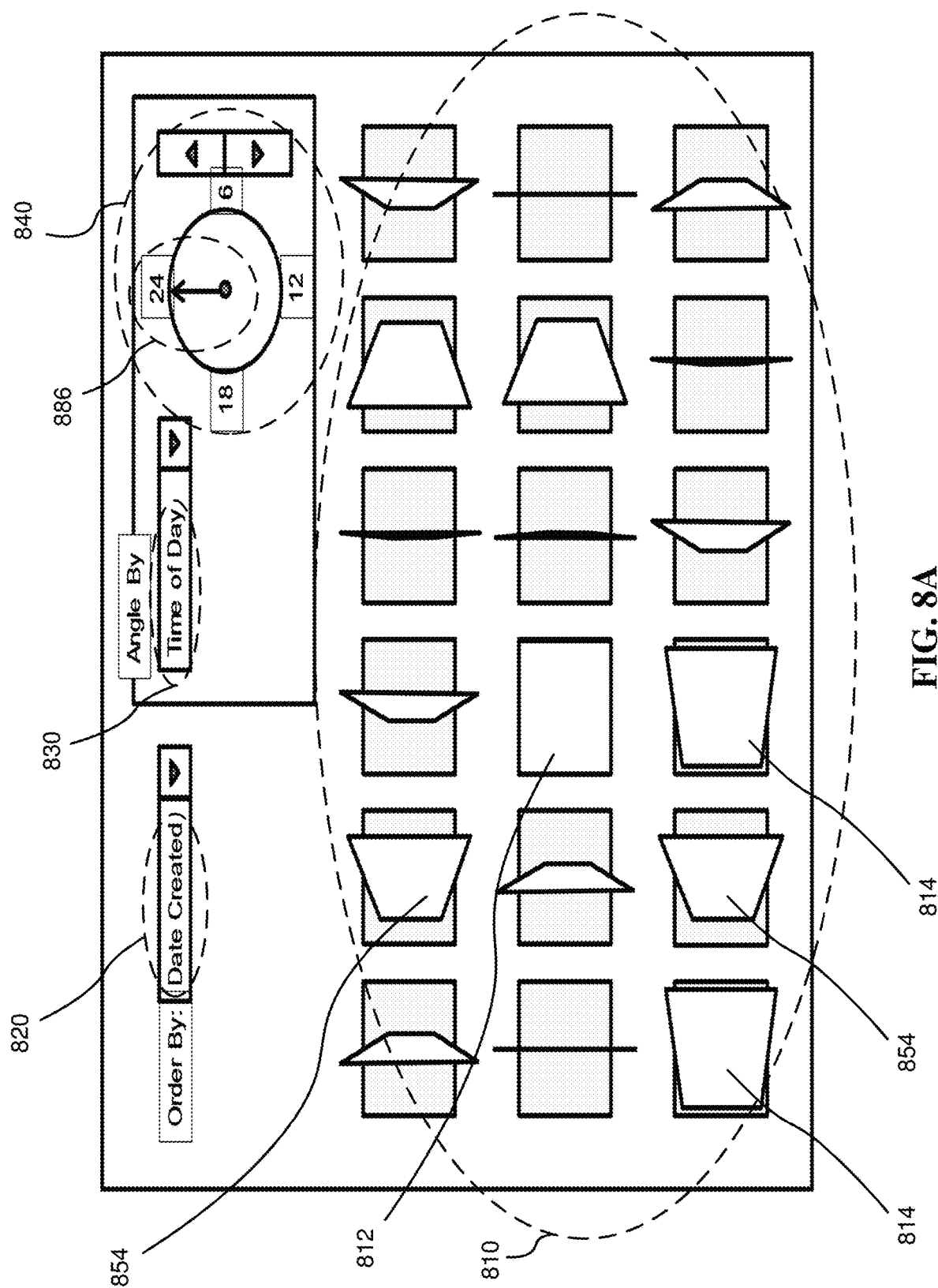
FIG. 8A depicts a graphical display in accordance with an embodiment of the present invention.

Referring to FIG. 8A, for example, the present invention could display computer graphics 810 (examples of computer graphics 310) in arrangement order 190, calculated with respect to computer graphics attribute data 180 and arrangement attribute data 182 (indicating an arrangement attribute 820 of "Date Created" (an example of arrangement attribute 320) and in orientations corresponding to orientation values 192, calculated with respect to computer graphics attribute values (indicated by computer graphics attribute data 180) and an orientation attribute value 886 of "24" (i.e., 2400 hour/0000 hour) (an example of orientation attribute value 186) (indicating a value of an orientation attribute 830 of "Time of Day) (an example of orientation attribute 330) indicated by orientation attribute data 184), where "24" could indicate one of 8 time ranges, namely the "0000 hour to 0300 hour" time range. In a further example, the present invention could display computer graphics 812 (an example of computer graphics 312) in a two-dimensional orientation (i.e., the original orientation of computer graphics 812) if the "Time of Day" computer graphics attribute value of computer graphics 812 is equals "24" (e.g., if computer graphics attribute value of computer graphics 812 is within the "0000 hour to 0300 hour", time range). In another example, the present invention could display computer graphics 814 (an example of computer graphics 314) in a first oblique orientation toward the left side of the computer display if the "Time of Day" computer graphics attribute values of computer graphics 814 are less than "24" (e.g., if the computer graphics attribute value of computer graphics 814 falls within the "0300 hour to 0600 hour", time range). In another example, the present invention could display computer graphics 854 (an example of computer graphics 314) in a further first oblique orientation further toward the left side of the computer display if the "Time of Day" computer graphics attribute values of computer graphics 854 are less than "24" to an extent more than computer graphics 814 (e.g., if the computer graphics attribute value of computer graphics 854 falls within the "0600 hour to 0430 hour", time range).

Figure 8B:
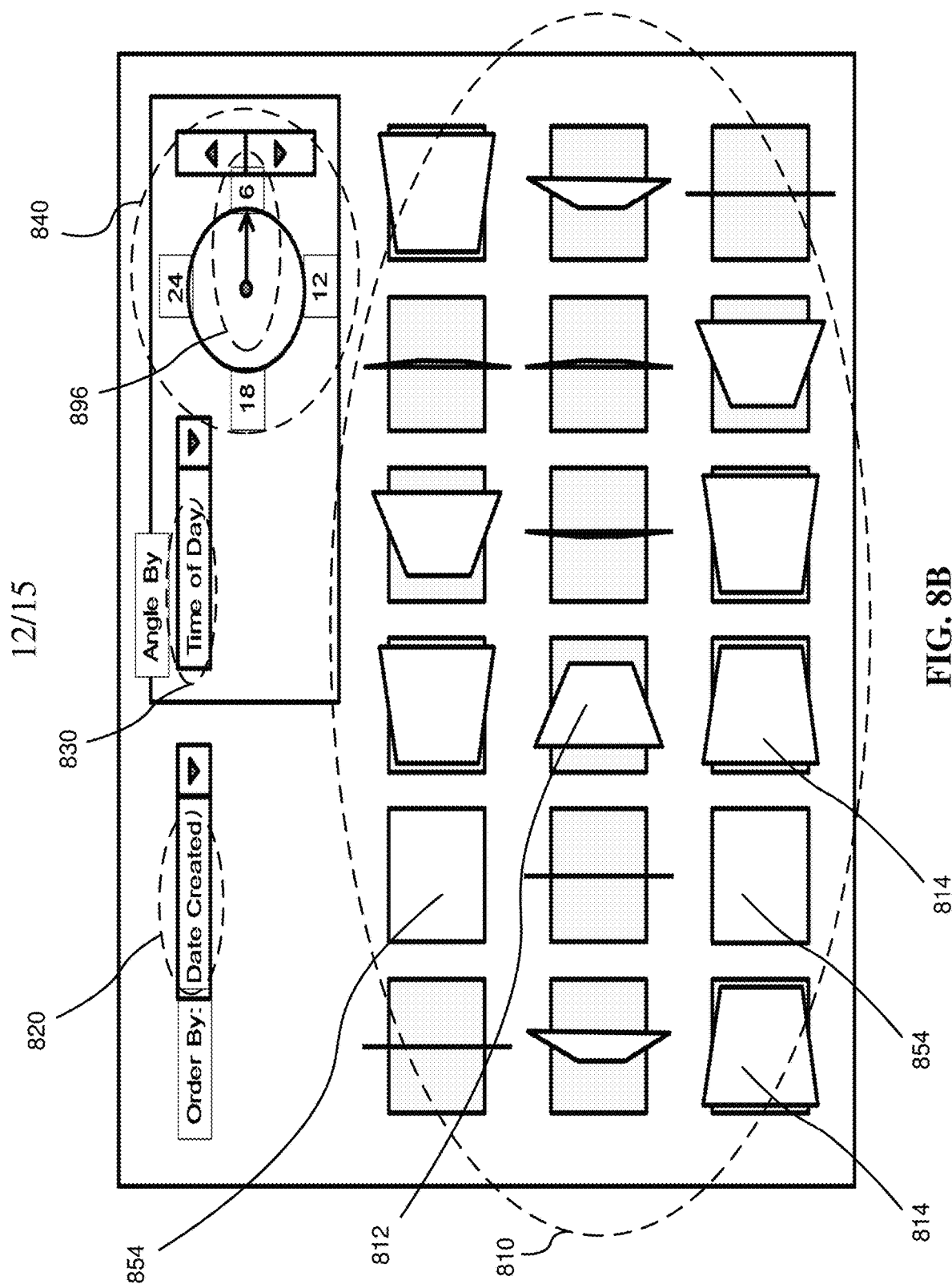
FIG. 8B depicts a graphical display in accordance with an embodiment of the present invention.

Referring to FIG. 8B, for example, the present invention could display computer graphics 810 (examples of computer graphics 310) in arrangement order 190, calculated with respect to computer graphics attribute data 180 and arrangement attribute data 182 (indicating an arrangement attribute 820 of "Date Created" (an example of arrangement attribute 320) and in orientations corresponding to orientation values 192, calculated with respect to computer graphics attribute values (indicated by computer graphics attribute data 180) and an orientation attribute value 896 of "6" (i.e., 600 hour/0600 hour) (an example of orientation attribute value 186) (indicating a value of an orientation attribute 830 of "Time of Day) (an example of orientation attribute 330) indicated by orientation attribute data 184), where "6" could indicate one of 8 time ranges, namely the "0600 hour to 0900 hour" time range. In a further example, the present invention could display computer graphics 854 (an example of computer graphics 312) in a two-dimensional orientation (i.e., the original orientation of computer graphics 854) if the "Time of Day" computer graphics attribute value of computer graphics 854 is equals "6" (e.g., if computer graphics attribute value of computer graphics 854 is within the "0600 hour to 0900 hour", time range). In another example, the present invention could display computer graphics 814 (an example of computer graphics 316) in a second oblique orientation toward the right side of the computer display if the "Time of Day" computer graphics attribute values of computer graphics 814 is greater than "6" (e.g., if the computer graphics attribute value of computer graphics 814 falls within the "0900 hour to 1200 hour", time range).

In another example, the present invention could display computer graphics 812 (an example of computer graphics 316) in a further second oblique orientation further toward the right side of the computer display if the "Time of Day" computer graphics attribute values of computer graphics 812 is greater than "6" to an extent more than computer graphics 814 (e.g., if the computer graphics attribute value of computer graphics 812 falls within the "1200 hour to 1500 hour", time range).

Referring to FIG. 8A and FIG. 8B, for example, the present invention could receive orientation attribute value 886, 896 via an orientation attribute value selector graphical user interface 840 displayed by the computer system on the computer display. In specific example, orientation attribute value selector graphical user interface 840 could allow for the inputting/selecting of orientation attribute value 886, 896 (e.g., via up and down arrow graphical user interface controls of orientation attribute value selector graphical user interface 840) in a manner similar to how the hands of clock rotate.

Referring to FIG. 8A and FIG. 8B, for example, computer graphics 810 could be thumbnails of digital photographs associated with a photograph image data management computer software application. In a specific example, the present invention could allow a user to identify a group of photos with attributes in addition to the order of the thumbnails. For example, the present invention could allow the user to specify to arrange thumbnails by arrangement attribute 320, 820 (e.g., timestamps/creation dates of when the photos were taken/recorded by a digital camera) and to specify to set angles of thumbnails by orientation attribute 330, 830 (e.g., "time of day" the photos were taken by the digital camera). In a further example, the present invention could allow the user to change the current time/"time of day" by orientation attribute value selector graphical user interface 840 (e.g., a computer pointer mouse wheel/up and down arrows that moves the hands of graphical user interface clock indicator), where the present invention displays thumbnails taken in the current "time of day" in front in a two-dimensional orientation while displaying other thumbnails in orientations/angles according to how past/future from the current "time of day" such thumbnails were taken.

Computer System

In an exemplary embodiment, the computer system is a computer system 900 as shown in FIG. 9. Computer system 900 is only one example of a computer system and is not intended to suggest any limitation as to the scope of use or functionality of embodiments of the present invention. Regardless, computer system 900 is capable of being implemented to perform and/or performing any of the functionality/operations of the present invention.

Computer system 900 includes a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 912 may be described in the general context of computer system-executable instructions, such as program modules, being executed by a computer system. Generally, program modules may include routines, programs, objects, components, logic, and/or data structures that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computer system 900 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and includes both volatile and non-volatile media, removable and non-removable media.

System memory 928 can include computer system readable media in the form of volatile memory, such as random access memory (RAM) 830 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions/operations of embodiments of the invention.

Program/utility 940, having a set (at least one) of program modules 942, may be stored in memory 928 by way of example, and not limitation. Exemplary program modules 942 may include an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the present invention.

Computer system/server 912 may also communicate with one or more external devices 914 such as a keyboard, a pointing device, a display 924, one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
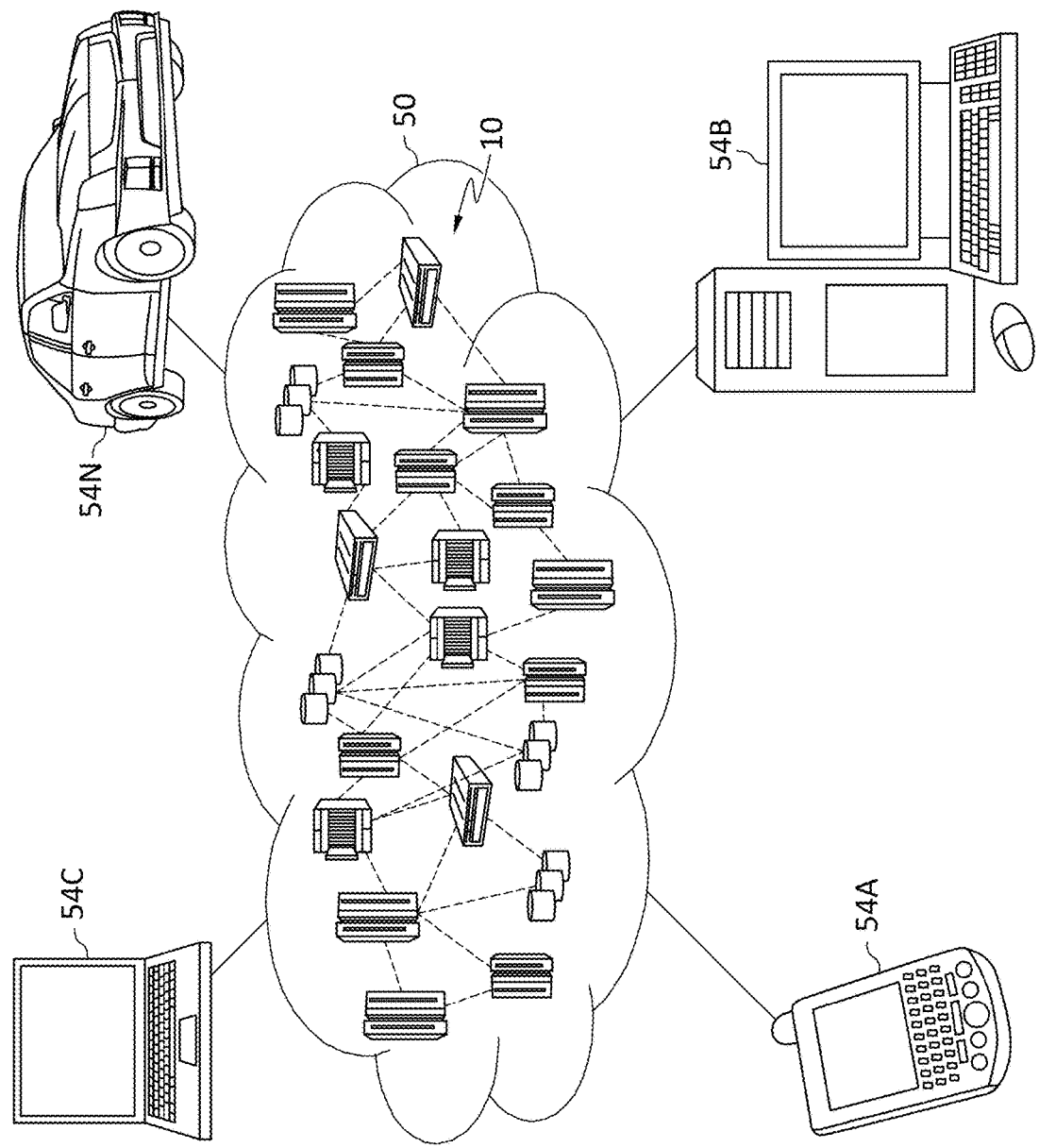
FIG. 10 depicts a cloud computing environment according to various embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
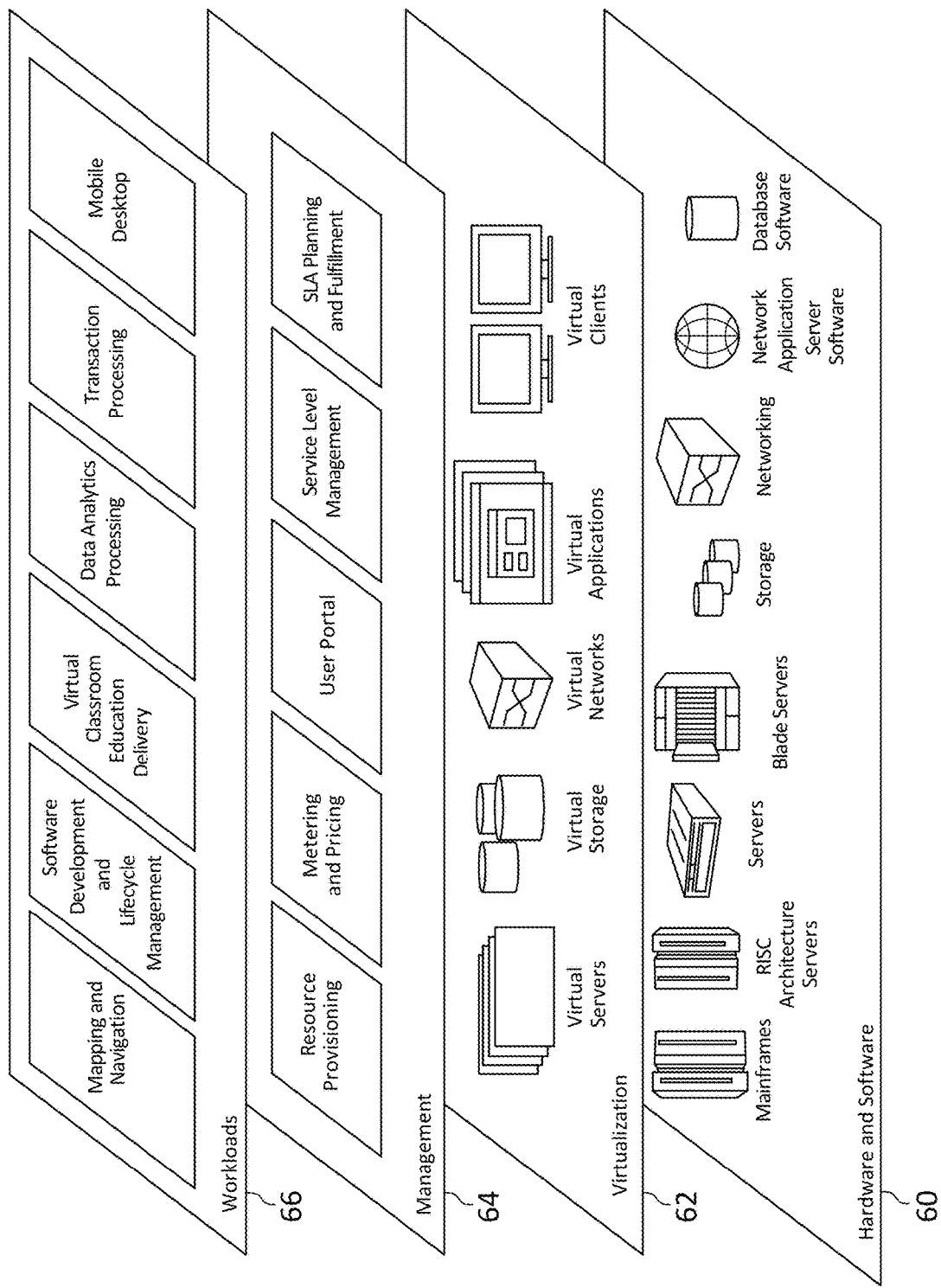
FIG. 11 depicts abstraction model layers according to various embodiments of the present invention.

Referring now to FIG. 11, a set of functional abstraction layers provided by cloud computing environment 50 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
  receiving, by a computer system, computer graphics attribute data of computer graphics,
    wherein the computer graphics attribute data indicate computer graphics attributes and computer graphics attribute values of the computer graphics,
      wherein the computer graphics attribute values indicate values of the computer graphics attributes;
  receiving, by the computer system, an orientation attribute value indicating a value of an orientation attribute;
  receiving, by the computer system, orientation attribute data indicating the orientation attribute, wherein the orientation attribute signifies that the computer graphics are to be rotated according to the orientation attribute value;
  calculating, by the computer system, rotation values for the computer graphics with respect to the computer graphics attribute values and the orientation attribute value; and
  displaying, by the computer system and on the computer display, the computer graphics and in rotations corresponding to the rotation values, resulting in displayed computer graphics.

2. The method of claim 1 wherein the computer graphics comprise at least one of computer icons and digital images.

3. The method of claim 1 wherein the calculating the rotation values comprises:
  for a first subset of the computer graphics, in response to determining by the computer system that a computer graphics attribute value, among the computer graphics attribute values, of the first subset equals the orientation attribute value, setting, by the computer system, a rotation value, among the rotation values, for the first subset to a value such that the first is displayed in a two-dimensional orientation;
  for a second subset of the computer graphics, in response to determining by the computer system that a computer graphics attribute value, among the computer graphics attribute values, of the second subset is less than the orientation attribute value, setting, by the computer system, rotation value, among the rotation values, for the second subset to a value such that the second subset is displayed in a first oblique orientation in proportion to an extent to which the computer graphics attribute value is less than the orientation attribute value; and for a third subset of the computer graphics, in response to determining by the computer system that a computer graphics attribute value, among the computer graphics attribute values, of the third subset is greater than the orientation attribute value, setting, by the computer system, rotation value, among the rotation values, for the third subset to a value such that the third subset is displayed in a second oblique orientation in proportion to an extent to which the computer graphics attribute value is greater than the orientation attribute value.

4. The method of claim 3 wherein the displaying comprises in response to determining that the computer graphics attribute value of the first subset equals the orientation attribute value, displaying the first subset in the two-dimensional orientation, wherein the two-dimensional orientation is equivalent to an original orientation of the first subset.

5. The method of claim 3 wherein the displaying comprises in response to determining that the computer graphics attribute value of the second subset is less than the orientation attribute value, displaying the second subset in the first oblique orientation such that the second subset is rendered by the computer system on the computer display to appear to be rotated towards a first part of the computer display.

6. The method of claim 5 wherein the displaying comprises in response to determining that the computer graphics attribute value of the third subset is greater than the orientation attribute value, displaying the third subset in the second oblique orientation such that the third subset is rendered by the computer system on the computer display to appear to be rotated towards a second part of the computer display.

7. The method of claim 6
wherein the first part of the computer display is a left side of the computer display, and
wherein the second part of the computer display is a right side of the computer display.

8. The method of claim 1 wherein the receiving the orientation attribute value comprises receiving the orientation attribute value via an orientation attribute value selector graphical user interface displayed by the computer system on the computer display.

9. The method of claim 1
wherein third subset is associated with a computer object, and
wherein the computer graphics attributes comprise quantifiable attributes,
wherein the quantifiable attributes comprise at least one of a type attributed to the computer object, a name attributed to the computer object, and at least one timestamp associated with the computer object.

10. The method of claim 1 wherein the displaying comprises:
displaying, by the computer system, the computer graphics in the orientations corresponding to the rotation values in a virtual reality environment with respect to a viewpoint in the virtual reality environment, resulting in virtual reality displayed computer graphics; and
in response to detecting by the computer system a change in the viewpoint resulting in a changed viewpoint in the virtual reality environment, displaying, by the computer system, the virtual reality displayed computer graphics with an altered appearance with respect to the changed viewpoint in the virtual reality environment.

11. A system comprising:
a memory; and
a processor in communication with the memory, the processor configured to perform a method comprising,
receiving computer graphics attribute data of computer graphics,
wherein the computer graphics attribute data indicate computer graphics attributes and computer graphics attribute values of the computer graphics,
wherein the computer graphics attribute values indicate values of the computer graphics attributes,
receiving an orientation attribute value indicating a value of an orientation attribute,
receiving orientation attribute data indicating the orientation attribute, wherein the orientation attribute signifies that the computer graphics are to be rotated according to the orientation attribute value,
calculating rotation values for the computer graphics with respect to the computer graphics attribute values and the orientation attribute value, and
displaying, on the computer display, the computer graphics in rotations corresponding to the rotation values, resulting in displayed computer graphics.

12. The system of claim 11 wherein the computer graphics comprise at least one of computer icons and digital images.

13. The system of claim 11 wherein the calculating the rotation values comprises:
for a first subset of the computer graphics, in response to determining that a computer graphics attribute value, among the computer graphics attribute values, of the first subset equals the orientation attribute value, setting an rotation value, among the rotation values, for the first subset to a value such that the first subset is displayed in a two-dimensional orientation;
for a second subset of the computer graphics, in response to determining that a computer graphics attribute value, among the computer graphics attribute values, of the second subset is less than the orientation attribute value, setting an rotation value, among the rotation values, for the second subset to a value such that the second subset is displayed in a first oblique orientation in proportion to an extent to which the computer graphics attribute value is less than the orientation attribute value; and
for a third subset of the computer graphics, in response to determining that a computer graphics attribute value, among the computer graphics attribute values, of the third subset is greater than the orientation attribute value, setting an rotation value, among the rotation values, for the third subset to a value such that the third subset is displayed in a second oblique orientation in proportion to an extent to which the computer graphics attribute value is greater than the orientation attribute value.

14. The system of claim 13 wherein the displaying comprises in response to determining that the computer graphics attribute value of the first subset equals the orientation attribute value, displaying the first subset in the two-dimensional orientation, wherein the two-dimensional orientation is equivalent to an original orientation of the first subset.

15. The system of claim 13 wherein the displaying comprises in response to determining that the computer graphics attribute value of the second subset is less than the orientation attribute value, displaying the second subset in the first oblique orientation such that the second subset is rendered on the computer display to appear to be rotated towards a first part of the computer display.

16. The system of claim 15 wherein the displaying comprises in response to determining that the computer graphics attribute value of the third subset is greater than the orientation attribute value, displaying the third subset in the second oblique orientation such that the third subset is rendered on the computer display to appear to be rotated towards a second part of the computer display.

17. The system of claim 11 wherein the receiving the orientation attribute value comprises receiving the orientation attribute value via an orientation attribute value selector graphical user interface displayed on the computer display.

18. A computer program product comprising a computer readable storage medium having program instructions embodied therewith, the program instructions executable by a processor to cause the processor to perform a method comprising:

receiving computer graphics attribute data of computer graphics,
   wherein the computer graphics attribute data indicate computer graphics attributes and computer graphics attribute values of the computer graphics,
   wherein the computer graphics attribute values indicate values of the computer graphics attributes;
receiving an orientation attribute value indicating a value of an orientation attribute;
receiving orientation attribute data indicating the orientation attribute, wherein the orientation attribute signifies that the computer graphics are to be rotated according to the orientation attribute value;
calculating rotation values for the computer graphics with respect to the computer graphics attribute values and the orientation attribute value; and
displaying, on the computer display, the computer graphics in rotations corresponding to the rotation values, resulting in displayed computer graphics.

\* \* \* \* \*